(12) United States Patent
Ishihara et al.

(10) Patent No.: US 7,620,732 B2
(45) Date of Patent: Nov. 17, 2009

(54) APPARATUS FOR AND METHOD OF SETTING COMMUNICATION PATH

(75) Inventors: Takeshi Ishihara, Kanagawa (JP); Akira Ichie, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 459 days.

(21) Appl. No.: 10/990,953

(22) Filed: Nov. 18, 2004

(65) Prior Publication Data
US 2005/0111384 A1    May 26, 2005

(30) Foreign Application Priority Data

Nov. 18, 2003 (JP) .............................. 2003-387914
Feb. 12, 2004 (JP) .............................. 2004-035564

(51) Int. Cl.
*G06F 15/173* (2006.01)
(52) U.S. Cl. ...................................... 709/241; 709/245
(58) Field of Classification Search ......... 709/238–242, 709/227, 245
See application file for complete search history.

(56) References Cited

U.S. PATENT DOCUMENTS

| | | | |
|---|---|---|---|
| 6,339,595 B1 * | 1/2002 | Rekhter et al. .............. | 370/392 |
| 6,425,003 B1 * | 7/2002 | Herzog et al. ............... | 709/223 |
| 6,892,245 B1 * | 5/2005 | Crump et al. ............... | 709/245 |
| 2001/0039591 A1 * | 11/2001 | Nomura et al. ............. | 709/238 |
| 2001/0047421 A1 * | 11/2001 | Sridhar et al. .............. | 709/230 |
| 2002/0112073 A1 * | 8/2002 | MeLampy et al. .......... | 709/240 |
| 2002/0138649 A1 * | 9/2002 | Cartmell et al. ............ | 709/245 |
| 2003/0065763 A1 * | 4/2003 | Swildens et al. ........... | 709/224 |
| 2003/0093523 A1 * | 5/2003 | Cranor et al. .............. | 709/225 |
| 2003/0172183 A1 * | 9/2003 | Anderson et al. ........... | 709/245 |

(Continued)

FOREIGN PATENT DOCUMENTS

JP    2002-44076    2/2002

(Continued)

OTHER PUBLICATIONS

Shaikh et al., "On the Effectiveness of DNS-based Server Selection." Apr. 22, 2001, IEEE: INFOCOM 2001, Twentieth Annual Joint Conference of the IEEE Computer and Communications Societies, Proceedings. vol. 3, pp. 1801-1810.*

(Continued)

*Primary Examiner*—Andrew Caldwell
*Assistant Examiner*—Christopher Biagini
(74) *Attorney, Agent, or Firm*—Finnegan, Henderson, Farabow, Garrett & Dunner, L.L.P.

(57) ABSTRACT

An apparatus is for setting a communication path between a communication terminal device connected through a first network and a plurality of second networks. The apparatus includes a name resolution request generator, a destination determiner, and a path setting unit. The name resolution request generator generates and transmits a name resolution request addressed to a name resolution server of the second networks, based on a name resolution request for name resolution of a destination received from the communication terminal device. The destination determiner assigns a priority to a name resolution response received from the name resolution server, and determines a destination based on the priority. The path setting unit sets a path by generating a routing table from path information including address information of the destination, address information of a gateway of the second networks, and an interface name.

20 Claims, 28 Drawing Sheets

U.S. PATENT DOCUMENTS

| | | | |
|---|---|---|---|
| 2003/0214955 A1* | 11/2003 | Kim | 370/400 |
| 2004/0039798 A1* | 2/2004 | Hotz et al. | 709/219 |
| 2004/0122651 A1* | 6/2004 | Herle | 703/27 |
| 2005/0021841 A1* | 1/2005 | Yoshimoto | 709/238 |

FOREIGN PATENT DOCUMENTS

| | | | |
|---|---|---|---|
| JP | 2002-118602 | | 4/2002 |
| JP | 2003-115861 | * | 4/2003 |
| JP | 2003-152781 | * | 5/2003 |

OTHER PUBLICATIONS

Office Action mailed by the Japanese Patent Office on Nov. 14, 2006, for Japanese Patent Application No. 2003-387914, and Partial English Translation thereof.

Otaka et al., "Seamless Access to Multiple Networks Using Domain Name Resolution," NTT Technical Review (Jan. 2004), 2:85-88.

ISDN Terminal Adaptor Aterm IR450/D (PC-IR450DIA) Aterm IR450 (PC-IR450DIA) Manual, NEC Corporation, 4th Ed. (Oct. 1999), pp. 1-11.

* cited by examiner

FIG.3

| CONNECTION | INTERFACE | STATUS | AUTOMATIC CONNECTION/ DISCONNECTION | INTERFACE IP ADDRESS | GATEWAY IP ADDRESS | DOMAIN | NAME RESOLUTION SERVER IP ADDRESS |
|---|---|---|---|---|---|---|---|
| CONNECTION 1 | INF_XX | CONNECTED | MAN | 133.196.26.126 | 133.196.26.254 | | 133.196.26.100 |
| CONNECTION 2 | INF_YY | | MAN | 133.196.36.126 | 133.196.36.254 | | 133.196.36.100 |
| CONNECTION 3 | INF_ZZ | | MAN | 133.196.46.126 | 133.196.46.254 | | 133.196.46.100 |

FIG.4

| CONNECTION | INTERFACE | STATUS | AUTOMATIC CONNECTION/ DISCONNECTION | INTERFACE IP ADDRESS | GATEWAY IP ADDRESS | DOMAIN | NAME RESOLUTION SERVER IP ADDRESS |
|---|---|---|---|---|---|---|---|
| CONNECTION 1 | INF_XX | CONNECTED | MAN | 133.196.26.126 | 133.196.26.254 | netone.co.jp | 133.196.26.100 |
| CONNECTION 2 | INF_YY | DIS-CONNECTED | AUTO | | | | |
| CONNECTION 3 | INF_ZZ | CONNECTED | MAN | 133.196.46.126 | 133.196.46.254 | | 133.196.46.100 |

FIG.5

| CONNECTION | INTERFACE | STATUS | AUTOMATIC CONNECTION/ DISCONNECTION | INTERFACE IP ADDRESS | GATEWAY IP ADDRESS | DOMAIN | NAME RESOLUTION SERVER IP ADDRESS |
|---|---|---|---|---|---|---|---|
| CONNECTION 1 | INF_XX | CONNECTED | × | 133.196.26.126 | 133.196.26.254 | netone.co.jp | 133.196.26.100 |
| CONNECTION 2 | INF_YY | CONNECTED | × | 133.196.36.126 | 133.196.36.254 | nettwo.co.jp | 133.196.36.100 |
| CONNECTION 3 | INF_ZZ | CONNECTED | × | 133.196.46.126 | 133.196.46.254 | netthree.co.jp | 133.196.46.100 |

FIG.6

| DESTINATION DOMAIN | DESTINATION IP ADDRESS | GATEWAY IP ADDRESS | PERIOD OF VALIDITY (TIME) | VALID/INVALID |
|---|---|---|---|---|
| hone.netone.co.jp | 133.196.18.1/32 | 133.196.46.254 | t | VALID |
| hone.netone.co.jp | 133.196.18.2/32 | 133.196.46.254 | t | VALID |
| hone.netone.co.jp | 133.196.18.3/32 | 133.196.46.254 | t | VALID |

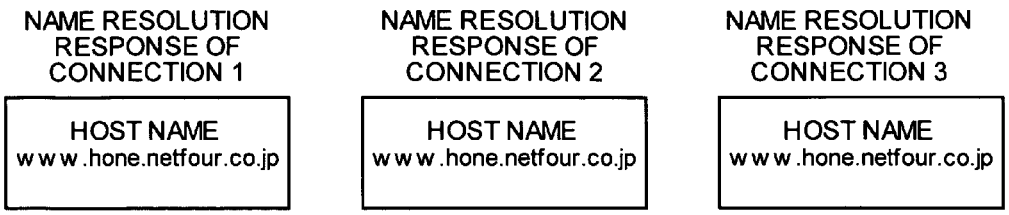
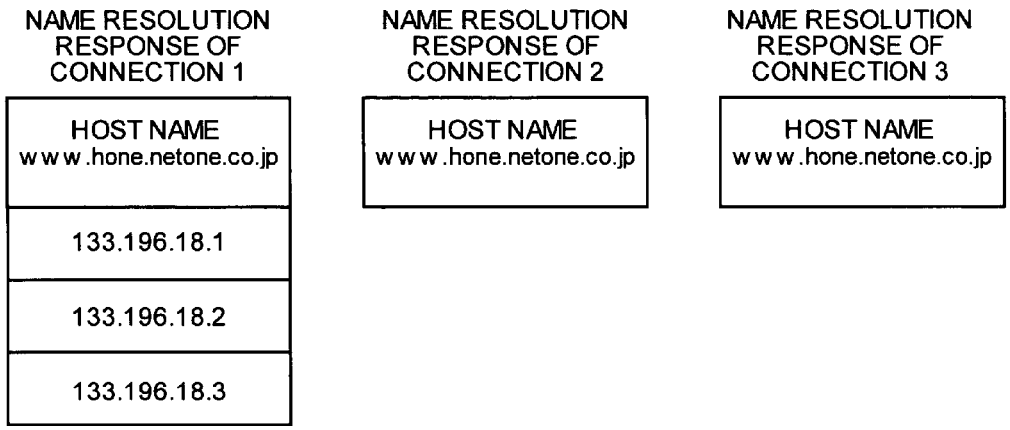

FIG.10

| DESTINATION IP ADDRESS | GATEWAY IP ADDRESS | INTERFACE |
|---|---|---|
| 133.196.18.1 | 133.196.26.254 | IF_XX |
| 133.196.18.2 | 133.196.26.254 | IF_XX |
| 133.196.18.3 | 133.196.26.254 | IF_XX |

FIG.11

| DESTINATION IP ADDRESS | GATEWAY IP ADDRESS | INTERFACE |
|---|---|---|
| 133.196.16.2 | 133.196.46.254 | IF_XX |
| 133.196.16.3 | 133.196.46.254 | IF_XX |

FIG.19

| DESTINATION IP ADDRESS | AGGREGATED IP ADDRESS | DELETION REQUESTED OR NOT REQUESTED |
|---|---|---|
| 133.196.18.0/32 | 133.196.18.0/30 | NOT REQUESTED |
| 133.196.18.1/32 | | NOT REQUESTED |
| 133.196.18.2/32 | | NOT REQUESTED |
| 133.196.18.3/32 | | NOT REQUESTED |

FIG.24

| NAME PATTERN | IDENTIFICATION INFORMATION OF EXTERNAL INTERFACE OF DESTINATION NETWORK |
|---|---|
| *.th-cmp.co.jp | PPP0 (NETWORK 80) |
| *.exm.jp | PPP1 (NETWORK 90) |
| *.fex | PPP2 (NETWORK 70) |
| ... | ... |

| IDENTIFICATION INFORMATION OF EXTERNAL INTERFACE OF DESTINATION NETWORK | IP ADDRESS OF NAME RESOLUTION SERVER |
|---|---|
| PPP0 (NETWORK 80) | 133. 196. 16. 70 |
| PPP1 (NETWORK 90) | 100. 10. 20. 50 |
| PPP2 (NETWORK 70) | 10. 0. 5. 5 |
| ... | ... |

| NETWORK RANGE | IDENTIFICATION INFORMATION OF EXTERNAL INTERFACE OF DESTINATION NETWORK |
|---|---|
| 133.196. 16. 0/24 | PPP0 (NETWORK 80) |
| 100. 10. 0. 0/16 | PPP1 (NETWORK 80) |
| 10. 0. 0. 0/8 | PPP2 (NETWORK 70) |
| ... | ... |

```
;; QUESTION SECTION:
;20.16.96.33.in-addr.arpa.    IN    SOA

;; AUTHORITY SECTION:
16.96.33.in-addr.arpa. 600    IN    SOA    ns1.th-cmp.co.jp. ns2.th-cmp.co.jp.
1070604457 10800 3600
 1728000 600
```

FIG.28

```
;; QUESTION SECTION:
;16.96.33.in-addr.arpa.    IN    SOA

;; ANSWER SECTION:
16.96.33.in-addr.arpa. 10800  IN    SOA    ns1.th-cmp.co.jp. ns2.toshiba.co.jp.
1070604457 10800 3600 1728000 600

;; AUTHORITY SECTION:
16.96.33.in-addr.arpa. 10800  IN    NS     ns3.th-cmp.co.jp.
16.96.33.in-addr.arpa. 10800  IN    NS     ns1.th-cmp.co.jp.

;; ADDITIONAL SECTION:
ns1.th-cmp.co.jp. 10800 IN   A     33.96.10.1
ns3.th-cmp.co.jp. 10800 IN   A     33.96.10.10
```

APPARATUS FOR AND METHOD OF SETTING COMMUNICATION PATH

CROSS-REFERENCE TO RELATED APPLICATIONS

This application is based upon and claims the benefit of priority from the prior Japanese Patent Application Nos. 2003-387914 filed on Nov. 18, 2003 and 2004-035564 filed on Feb. 12, 2004 the entire contents of which are incorporated herein by reference.

BACKGROUND OF THE INVENTION

1) Field of the Invention

The present invention relates to a communication path setting apparatus, a communication path setting method, and a communication path setting program that set a communication path between at least a communication terminal device and a plurality of second networks connected through a first network, or more particularly to a communication path setting apparatus, a communication path setting method, and a communication path setting program capable of setting an appropriate communication path easily without a routing protocol or a path setting process on the part of the user.

2) Description of the Related Art

A communication path setting apparatus that sets a communication path between a communication terminal device and a plurality of second networks through a first network is generally known. In this communication path setting apparatus, a routing protocol is executed with a destination network according to a predetermined rule or the user sets a path for the communication path setting apparatus and determines a path according to the set path.

Japanese Patent Application Laid-Open (JP-A) No. 2003-152781, for example, discloses a conventional technique about a communication path setting apparatus in which the user sets the optimum path by correcting a routing table based on the attribute information and the connection information of the network in advance. JP-A No. 2003-115861, on the other hand, discloses a conventional technique about a communication path setting apparatus in which the user makes an inquiry at a name resolution server based on a routing table assigning the order of priority and thus sets a path by using name resolution.

In these conventional techniques, the communication path setting apparatus, upon receipt of a name resolution request of a destination host existing in a second network from a communication terminal device connected to a first network, transmits the particular name resolution request to the DNS (domain name system) server of the second network having the destination host, and in response to the name resolution request, receives a name resolution response containing the address information of the destination host retrieved by the DNS server. The IP address of the destination host contained in the name resolution response received is set in the routing table data, and transmitted to the communication terminal device that has issued the name resolution request. The communication terminal device that has received this IP address connects to the destination host according to the IP address thus received.

The conventional technique described above, however, poses the following problems. Specifically, according to JP-A No. 2003-152781, the routing table can be corrected based on the attribute information and the connection information of the network and thus can set the optimum path. Nevertheless, a unique service of notifying the attribute information and the connection information to the communication path setting apparatus is required, thereby limiting the destination. Another problem of this conventional technique is that the routing table is required to be set by the user in advance, and therefore the job of setting of a routing table is bothersome.

JP-A No. 2003-115861, on the other hand, harbors the problem that although the path can be set by the name resolution by making an inquiry at the name resolution server based on the routing table, the order of making an inquiry about the name is required to be set by the user in advance and therefore the setting of the order of priority is bothersome. Especially in the subscription line of an ordinary home, the routing protocol is rarely used and therefore the fact that the setting of the routing table and the order of priority is complicated is a great problem. Further, according to this conventional technique, the path to be set is addressed to a single device. In the case of communication with a multiplicity of devices, therefore, the routing table data are vast and complicated. As a result, the retrieval of the address in the packet transfer process consumes a considerable time. Especially in the subscription line of an ordinary home where the routing protocol is rarely used as described above, a path with an address in an appropriate network range cannot be set automatically.

SUMMARY OF THE INVENTION

It is an object of the present invention to at least solve the problems in the conventional technology.

An apparatus according to one aspect of the present invention is for setting a communication path between a communication terminal device connected through a first network and a plurality of second networks. The apparatus includes a name resolution request generator that generates and transmits a name resolution request addressed to a name resolution server located in the second networks, based on a name resolution request for name resolution of a destination received from the communication terminal device. The apparatus also includes a destination determiner that assigns a priority to a first name resolution response received from the name resolution server in response to the first name resolution request transmitted by the name resolution request generator, and determines a destination based on the priority; and a path setting unit that sets a path by generating a routing table from path information including address information of the destination determined by the destination determiner, address information of a gateway located in the second networks, and an interface name of the apparatus.

A method according to another aspect of the present invention is of setting a communication path between a communication terminal device connected through a first network and a plurality of second networks. The method includes generating a first name resolution request addressed to a name resolution server located in the second networks, based on a second name resolution request for name resolution of a destination received from the communication terminal device; transmitting the first name resolution request; assigning a priority to a first name resolution response received from the name resolution server in response to the first name resolution request transmitted; determining a destination based on the priority; and setting a path by generating a routing table from path information including address information of the destination determined, address information of a gateway located in the second networks, and an interface name.

The computer program product according to still another aspect of the present invention causes a computer to perform the method according to the present invention.

BRIEF DESCRIPTION OF THE DRAWINGS

FIG. 3 is a diagram that depicts an example of the connection status table data of the communication path setting apparatus shown in FIG. 2;

FIG. 4 is a diagram that depicts another example of the connection status table data of the communication path setting apparatus shown in FIG. 2;

FIG. 5 is a diagram that depicts an example of the connection status table data after the domain name retrieval in the communication path setting apparatus shown in FIG. 2;

FIG. 6 is a diagram that depicts an example of the cache of the communication path setting apparatus shown in FIG. 2;

FIG. 7 is a diagram that depicts an example of the name resolution response of the name resolution server shown in FIG. 2;

FIG. 8 is a diagram that depicts another example of the name resolution response of the name resolution server shown in FIG. 2;

FIG. 9 is a diagram that depicts still another example of the name resolution response of the name resolution server shown in FIG. 2;

FIG. 10 is a diagram that depicts an example of the routing table data set based on the name resolution response of the name resolution server shown in FIG. 8;

FIG. 11 is a diagram that depicts another example of the routing table data set based on the name resolution response of the name resolution server shown in FIG. 9;

FIG. 19 is a diagram that depicts an example of the path aggregation table data of the communication path setting apparatus shown in FIG. 18;

FIG. 24 is a diagram that depicts a data structure of an example of the name matching list 405*a*;

FIG. 25 is a diagram that depicts the data structure of an example of the name resolution server list 405*b*;

FIG. 26 is a diagram that depicts the data structure of an example of the routing table data 405*c*;

FIG. 27 is a diagram that explains an example of the authoritative name server resolution response;

FIG. 28 is a diagram that explains another example of the authoritative name server resolution response;

DETAILED DESCRIPTION

Exemplary embodiments of a communication path setting apparatus relating to the present invention will be explained in detail below with reference to the accompanying drawings.

Figure 1:
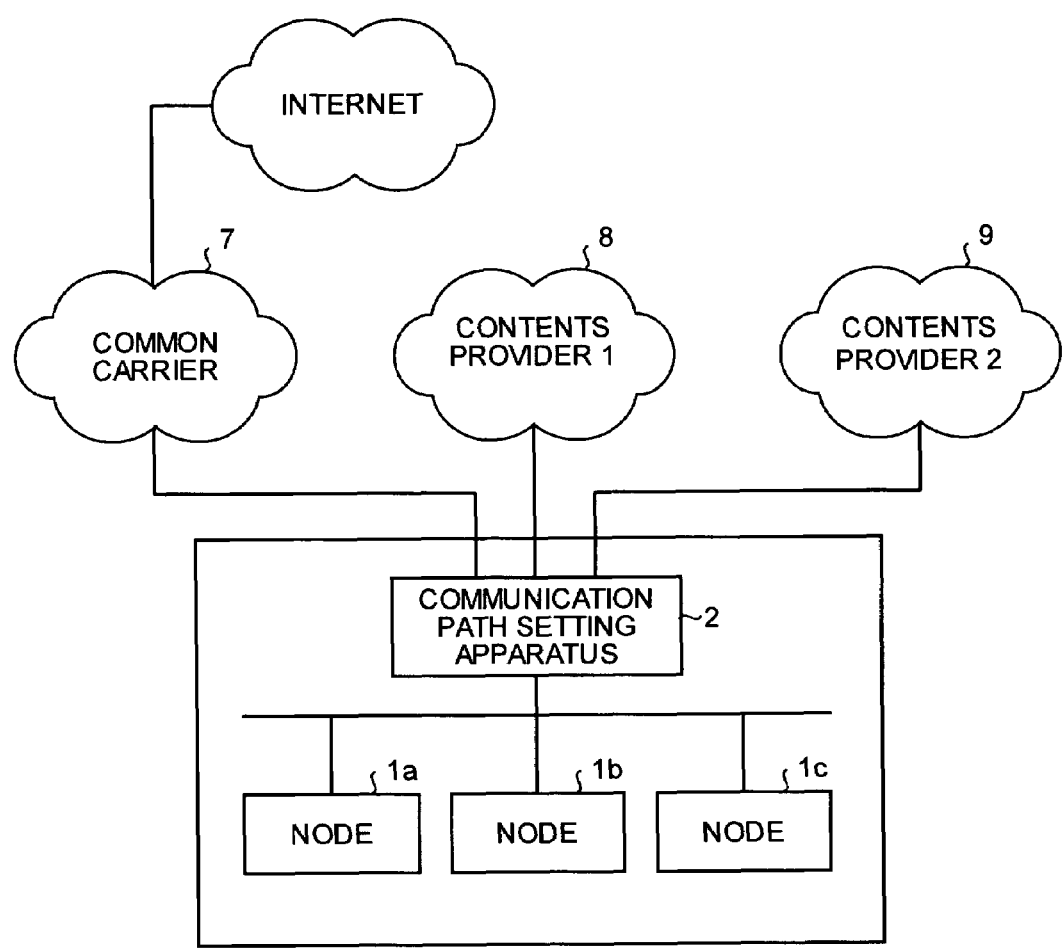
FIG. 1 is a diagram that explains the features of a communication path setting apparatus according to a first embodiment of the invention.

The features of the communication path setting apparatus according to a first embodiment will now be explained. FIG. 1 is a diagram that explains the features of the communication path setting apparatus according to the first embodiment. A shown in FIG. 1, the communication path setting apparatus 2 is connected to a plurality of nodes 1*a* to 1*c* through a network. Also, the communication path setting apparatus 2 is connected to a plurality of networks 7, 8, 9 provided by an internet provider, a contents provider 1 and a contents provider 2.

The communication path setting apparatus 2 according to this invention is generally intended to set a communication path between the nodes 1*a* to 1*c* connected through the first network and a plurality of second networks 7, 8, 9 and has the feature that an appropriate communication path can be easily set without the routing protocol or operation by the user. Specifically, the communication path setting apparatus 2 generates a name resolution request addressed to the name resolution server of the networks 7, 8, 9 based on a name resolution request received from the nodes 1*a* to 1*c* to request the name resolution of the destination, and transmits the name resolution request thus generated to the name resolution servers. The name resolution servers of the networks 7, 8, 9 transmit a name resolution response in compliance with the name resolution request, and the communication path setting apparatus 2 receives this name resolution response. The communication path setting apparatus 2 assigns the order of priority to the name resolution responses received, and in the order of priority thus assigned, determines the destination. The communication path setting apparatus 2 then generates a routing table from the path information containing the IP address of the destination, the IP addresses of the gateways existing in a plurality of networks and the interface name of itself and thus sets the path. As a result, without any routing protocol or operation by the user, the proper communication path can be easily set. Incidentally, the name resolution request is made to the name resolution server to search for the IP address corresponding to the host name of the destination or to search for the host name corresponding to the IP address of the destination.

Figure 2:
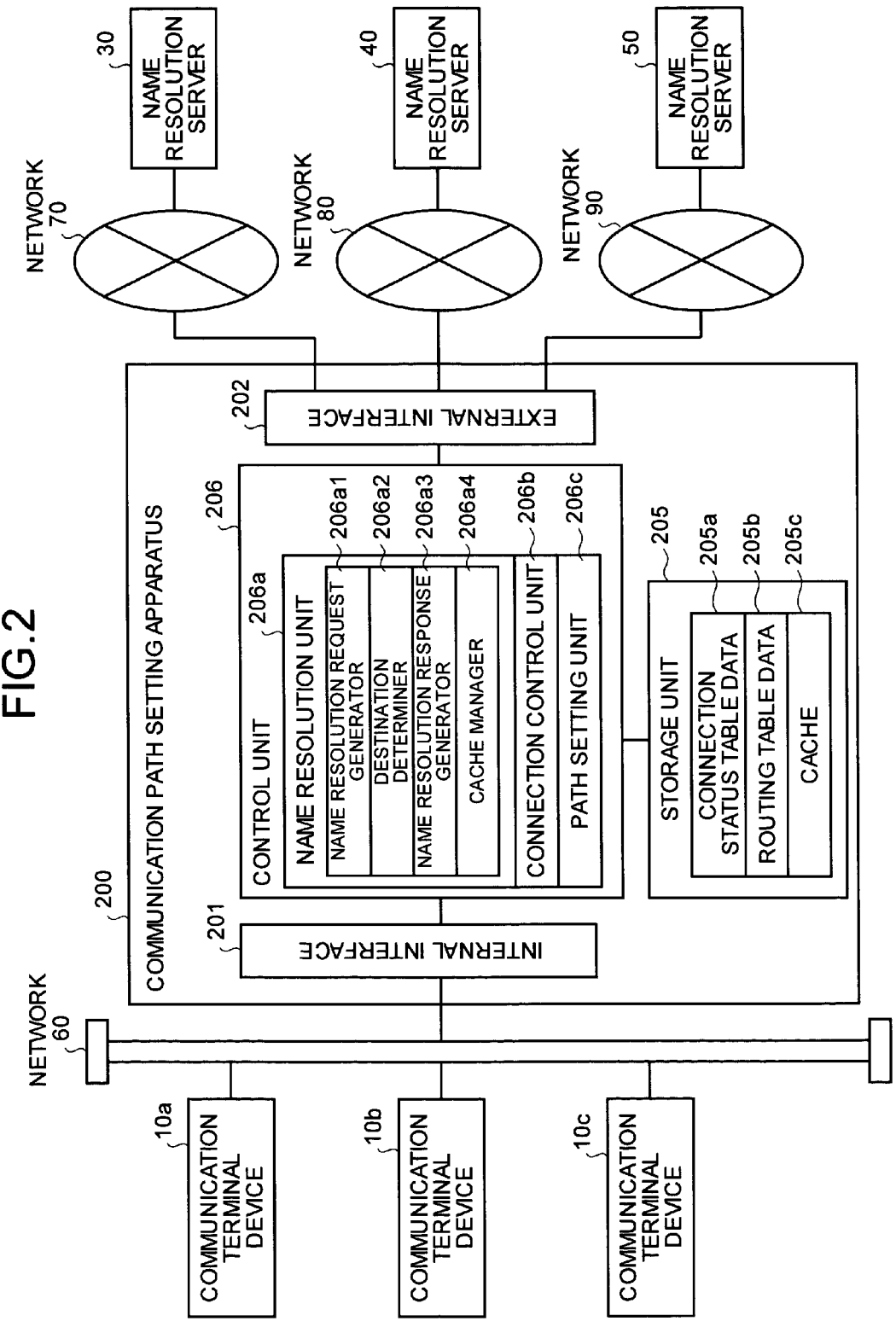
FIG. 2 is a function block diagram that depicts a configuration of a communication path setting system according to the first embodiment.

The configuration of the communication path setting system according to the first embodiment is explained. FIG. 2 is a function block diagram that depicts the configuration of the communication path setting system according to the first embodiment. As shown in FIG. 2, the communication path setting system comprises communication terminal devices 10a to 10c (correspond to the nodes 1a to 1c in FIG. 1), a communication path setting apparatus 200 (corresponds to the communication path setting apparatus 2 in FIG. 1), name resolution servers 30, 40, 50, a network 60 that connects the communication terminal devices 10a to 10c and the communication path setting apparatus 200 to each other, and networks 70, 80, 90 (correspond to the networks 7, 8, 9 in FIG. 1) that connect the communication path setting apparatus 20 and the name resolution servers 30, 40, 50. In the description below, the connection between the communication path setting apparatus 200 and a plurality of the networks 70, 80, 90 are defined as connection 1, connection 2 and connection 3, respectively.

The network 60 uses the TCP/IP protocol and is LAN (local area network), for example. The networks 70, 80, 90, which are operated/managed by the internet provider or the contents provider, are a lease line or WAN (wide area network).

The communication terminal devices 10a to 10c are communication devices connected by the network 60 and conduct the communication with the networks 70, 80, 90 through the communication path setting apparatus 200. Also, the name resolution servers 30, 40, 50 are DNS (domain name system) servers that conduct the name resolution in response to the name resolution request of the communication path setting apparatus 200 received through the networks 70, 80, 90, respectively.

The communication path setting apparatus 200 comprises an internal interface unit 201, an external interface unit 202, a storage unit 205 and a controller 206. The internal interface unit 201 is a network interface that conducts communication with the communication terminal devices 10a to 10c through the network 60. The external interface unit 202, on the other hand, is a network interface that conducts communication with the name resolution servers 30, 40, 50 through the networks 70, 80, 90.

The storage unit 205 is a RAM (random access memory) or the like memory and includes a connection status table data 205a, a routing table data 205b and a cache 205c. The connection status table data 205a is a table data for managing the connection between the communication path setting apparatus 200 and the networks 70, 80, 90. The routing table data 205b enables the communication path setting apparatus 200 to set the communication path between the communication terminal devices 10a to 10c and a plurality of the networks 70, 80, 90. The cache 205c is a storage unit for temporarily storing the path information of the destination, the period of validity of the path information and the information indicating whether the path information period of validity has passed or not. FIG. 3 is an example of the connection status table data 205a of the communication path setting apparatus 200 shown in FIG. 2. FIG. 4 is another example of the connection status table data 205a of the communication path setting apparatus 200 shown in FIG. 2. FIG. 5 is a diagram that depicts an example of the connection status table data 205a after searching for the domain name of the communication path setting apparatus 200 shown in FIG. 2.

The connection status table data 205a shown in FIG. 3 represents the one immediately after the user of the communication terminal devices 10a to 10c connects with the networks 70, 80, 90. The domain name is normally left blank unless manually set by the user. When the user sets the domain name manually, the domain name is input from the communication terminal devices 10a to 10c through a Web browser. This is explained in detail later with reference to the third embodiment.

The connection name of the connection status table data 205a is an identifier for the user to identify the connection with the networks 70, 80, 80. According to the first embodiment, the connection between the communication path setting apparatus 200 and the networks 70, 80, 90 are identified by the identifiers "connection 1", "connection 2" and "connection 3", respectively.

The "interface" is the name of the external interface unit 202 used for connection with the networks 70, 80, 90. Also, the "status" indicates the current connection status between the communication path setting apparatus 200 and the networks 70, 80, 90. The "automatic connection/disconnection" indicates that the communication is connected or disconnected automatically depending on the conditions such as the type of the service provided by the communication. When the contents provider distributes a movie, for example, the communication is disconnected automatically at the end of the movie. The term "AUTO" in the column indicates the automatic connection/disconnection of communication, and "MAN" the communication not automatically connected or disconnected.

The interface IP address is the IP address of the external interface unit 202. The gateway IP address is the IP address of the gateways of a plurality of the networks 70, 80, 90. The domain name is assigned or detected through the connection with the networks 70, 80, 90. The name resolution server IP address is the IP address of the name resolution servers 30, 40, 50 notified through the connection with the networks 70, 80, 90, respectively.

The IP address includes the IP address of the interface, the subnetmask for IPv4 and the prefix length of IPv6. The name resolution server IP address may include a plurality of IP addresses.

In the connection status table data 205a shown in FIG. 4, connection 2 is cut off, and the interface IP address, the gateway IP address, the domain name and the name resolution server IP address of connection 2 are blank. When connection 2 is requested by the name resolution request of the communication terminal devices 10a to 10c, connection 2 is established so that the interface IP address, the gateway IP address and the name resolution server IP address are set as connection 2 of the connection status table data 205a shown in FIG. 3 by the DHCP (dynamic host configuration protocol) or the like.

The connection status table data 205a of FIG. 5 contains the description of the domain names "netone.co.jp", "nettwo.co.jp" and "netthree.co.jp" assigned or detected through the connection with a plurality of networks. The domain names "netone.co.jp", "nettwo.co.jp" and "netthree.co.jp" are acquired based on the IP address related to the plurality of the networks 70, 80, 90 or the IP addresses of the name resolution servers 30, 40, 50 of the networks 70, 80, 90. Specifically, these domain names are acquired by the name resolution of the domain names from the gateway IP addresses of the networks 70, 80, 90 or the IP addresses of the name resolution servers 30, 40, 50. The name resolution of the domain name is explained again later.

Here, the cache 205c of the communication path setting apparatus 200 shown in FIG. 2 is explained further. FIG. 6 is an example of the cache 205c of the communication path setting apparatus 200 shown in FIG. 2. The cache contains the path information such as the destination host name, the destination IP address and gateway IP address and the cache information such as the period of validity of the path information and expiry/non-expiry of the period of validity. The period of validity is that of the name resolution information contained in the name resolution response. Also, whether the period of validity of the path information has expired is determined by the cache manager 206a4 of the name resolution unit 206a described later.

Returning to FIG. 2, the controller 206 controls the whole of the communication path setting apparatus 200 and in response to a user request or a command, controls the process of each part and the data flow. The controller 206 includes a name resolution unit 206a, a connection control unit 206b and a path setting unit 206c.

The name resolution unit 206a is a processor that receives the name resolution request of the communication terminal units 10a to 10c to conduct the name resolution, and includes a name resolution request generator 206a1, a destination determiner 206a2, a name resolution response generator 206a3 and a cache manager 206a4.

The name resolution request generator 206a1 is a processor that adds the addresses of the name resolution servers 30, 40, 50 of the networks 70, 80, 90 and generates a name resolution request based on the name resolution request received from the communication terminal units 10a to 10c. Also, the name resolution request generator 206a1 generates a name resolution request for the domain name of the name resolution servers 30, 40, 50 or the gateway requested by the connection control unit 206b.

The destination determiner 206a2, in response to the name resolution request transmitted by the name resolution request generator 206a1, receives a name resolution response from the name resolution servers 30, 40, 50 existing in the networks 70, 80, 90, and assigning the order of priority to the name resolution responses received, determines the destinations in the particular order of priority. Also, the destination determiner 206a2, based on the degree of analogy between the domain name of the name resolution response and the domain name set for the connection of the plurality of the networks 70, 80, 90, assigns the order of priority to the name resolution responses and determines the destinations in the particular order of priority. The destination determiner 206a2, if unable to assign the order of priority to the name resolution responses based on the analogy and determine the destinations in the particular order of priority from the name resolution responses, assigns the order of priority to the name resolution responses on first-come-first-served basis and determines the destinations in the particular order of priority.

The name resolution response of the name resolution servers 30, 40, 50 shown in FIG. 2 is explained. FIG. 7 is an example of the name resolution response of the name resolution servers shown in FIG. 2. FIG. 8 is another example of the name resolution response of the name resolution servers shown in FIG. 2. FIG. 9 is still another example of the name resolution response of the name resolution servers shown in FIG. 2.

The name resolution responses shown in FIG. 7 are those of the name resolution servers 30, 40, 50 of connections 1, 2 and 3, respectively, for the name resolution request of the communication terminal devices 10a, 10b or 10c for the host name "www.hone.netfour.co.jp". None of the name resolution responses of connections 1 to 3 contains the IP address. That is to say, none of the name resolution responses of connections 1 to 3 is a valid name resolution response.

The name resolution responses shown in FIG. 8 are those of the name resolution servers 30, 40, 50 of connections 1, 2, 3, respectively, for the name resolution requests of the communication terminal devices 10a, 10b, 10c for the host name "www.hone.netone.co.jp". The name resolution response of the name resolution server 30 of connection 1 alone contains three IP addresses "133.196.18.1", "133.196.18.2" and "133.196.18.3", of which only the name resolution response of the name resolution server 30 of connection 1 is valid.

The name resolution responses shown in FIG. 9 are those of the name resolution servers 30, 40, 50 of connections 1, 2, 3 for the name resolution requests of the communication terminal devices 10a, 10b, 10c, respectively, for the host name "www.hone.netthree.co.jp". The name resolution response of the name resolution server 30 of connection 1 contains the IP address "133.196.16.2", and the name resolution response of the name resolution server 50 of connection 3 contains the IP addresses "133.196.16.2" and "133.196.16.3". Thus, the two name resolution responses of the name resolution server 30 of connection 1 and the name resolution server 50 of connection 3 are valid.

When the two name resolution responses received from the name resolution server 30 of connection 1 and the name resolution server 50 of connection 3 are valid as described above, the destination determiner 206a2 assigns the order of priority to the name resolution responses based on the degree of analogy between the domain name of each name resolution response and the domain name shown in FIG. 5, and determines the destinations in the particular order of priority. The domain name acquired from the host name "www.hone.netthree.co.jp" of the name resolution response is "hone.netthree.co.jp". The domain names of connections 1 and 3, on the other hand, are "netone.co.jp" and "netthree.co.jp", respectively, as shown in FIG. 5.

Consequently, the domain name of the name resolution response received from the name resolution server 30 of connection 1 and the domain name of connection 1 share "co.jp", while the domain name of the name resolution response received from the name resolution server 50 of connection 3 and the domain name of connection 3 share "netthree.co.jp". Thus, the portion shared by the domain name of the name resolution response received from the name resolution server 50 of connection 3 and the domain name of connection 3 is larger than the portion shared by the domain name of the name resolution response received from the name resolution server 30 of connection 1 and the domain name of connection 1. In other words, the name resolution response received from the name resolution server 50 of connection 3 has a higher degree of analogy and a higher priority order than the name resolution response received from the name resolution server 30 of connection 1.

The destination determiner 206a2, therefore, determines the name resolution response of the name resolution server 50 of connection 3 as a destination IP address. Specifically, the destination addresses of the host name "www.hone.netthree.co.jp" are "133.196.16.2" and "133.196.16.3".

The name resolution response generator 206a3 is a processor that generates a name resolution response containing the destination determined by the destination determiner 206a2. Also, in the absence of the name resolution response returned from the name resolution servers 30, 40, 50 of the networks 70, 80, 90, the name resolution response generator 206a3 generates a response to the effect that the communication terminal devices 10a to 10c have no destination.

The cache manager 206a4 manages the information that determines whether the period of validity of the path information of the destination stored in the cache 205c has expired and the history of application for a predetermined period. Specifically, upon determination that the period of validity of the cache information stored in the cache 205c has expired and the cache information lacks the application history for the predetermined period, the path setting unit 206c is requested to delete the path information corresponding to the cache information from the routing table, thereby deleting the cache information.

The connection control unit 206b is a processor that controls the connection between the communication path setting apparatus 200 and the networks 70, 80, 90 and manages the connection status table data 205a. The connection control unit 206b requests the name resolution request generator 206a1 to acquire the domain name of the name resolution servers 30, 40, 50 or the gateway based on the address information of the name resolution servers 30, 40, 50 or the gateway existing in a plurality of the networks. Also, the connection control unit 206b disconnects or connects the communication between the communication terminal devices 10a to 10c and the networks 70, 80, 90 according to the type of the service provided by the communication.

The path setting unit 206c is a processor that sets a path by generating the routing table data 205b from the path information including the address information of the destination determined by the destination determiner 206a2, the address information of the gateway existing in the networks 70, 80, 90 and the interface name of itself.

When the range of application of the address information contained in the path information on the network is limited, the path setting unit 206c generates a host route corresponding to the address information of the destination determined by the destination determiner 206a2 and the address information of the gateway existing in the plurality of the networks, and the host route thus generated is set in the routing table data 205b. Also, when the cache manager 206a4 requests the path information to be deleted from the routing table data 205b, the path information is deleted from the routing table data 205b.

When the routing table data 205b contains any IP address sharing the connection with the IP address of the destination of the destination determined by the destination determiner 206a2, the path setting unit 206c aggregates the IP addresses of all the destinations using the same connection into an aggregated IP address and replaces all the IP addresses of the destination with the aggregated IP address information. Also, when the path information of which the deletion is requested by the cache manager 206a4 is contained in the routing table data 205b, the particular path information is deleted from the routing table data 205b, or when the particular path information is not contained in the routing table data 205b and the cache manager 206a4 requests the deletion of all the path information including the IP addresses of the destination aggregated as the aggregated IP address, the path information including the aggregated IP address information is deleted from the routing table data 205b.

Here, the routing table data 205b set based on the name resolution responses of the name resolution servers 30, 40, 50 shown in FIGS. 8 and 9 is explained. FIG. 10 is an example of the routing table data 205b set based on the name resolution responses of the name resolution servers 30, 40, 50 shown in FIG. 8. FIG. 11 is another example of the routing table data 205b set based on the name resolution responses of the name resolution servers 30, 40, 50 shown in FIG. 9.

FIG. 10 is the correspondence between the destination IP addresses "133.196.18.1", "133.196.18.2", "133.196.18.3" acquired from the name resolution responses of connection 1 shown in FIG. 8 and the gateway IP address "133.196.26.254" of connection 1 shown in FIG. 5. FIG. 11 is the correspondence between the IP addresses "133.196.16.2", "133.196.16.3" of the name resolution responses of connection 3 having a high degree of analogy among the destination IP addresses acquired from connections 1 and 3 shown in FIG. 9 and the gateway IP address "133.196.46.254" of connection 3. In this way, the path setting unit 206c sets a communication path to the networks 70, 80, 90 by the correspondence between the destination IP addresses and the gateway IP address of the networks in the routing table data 205b.

Figure 12:
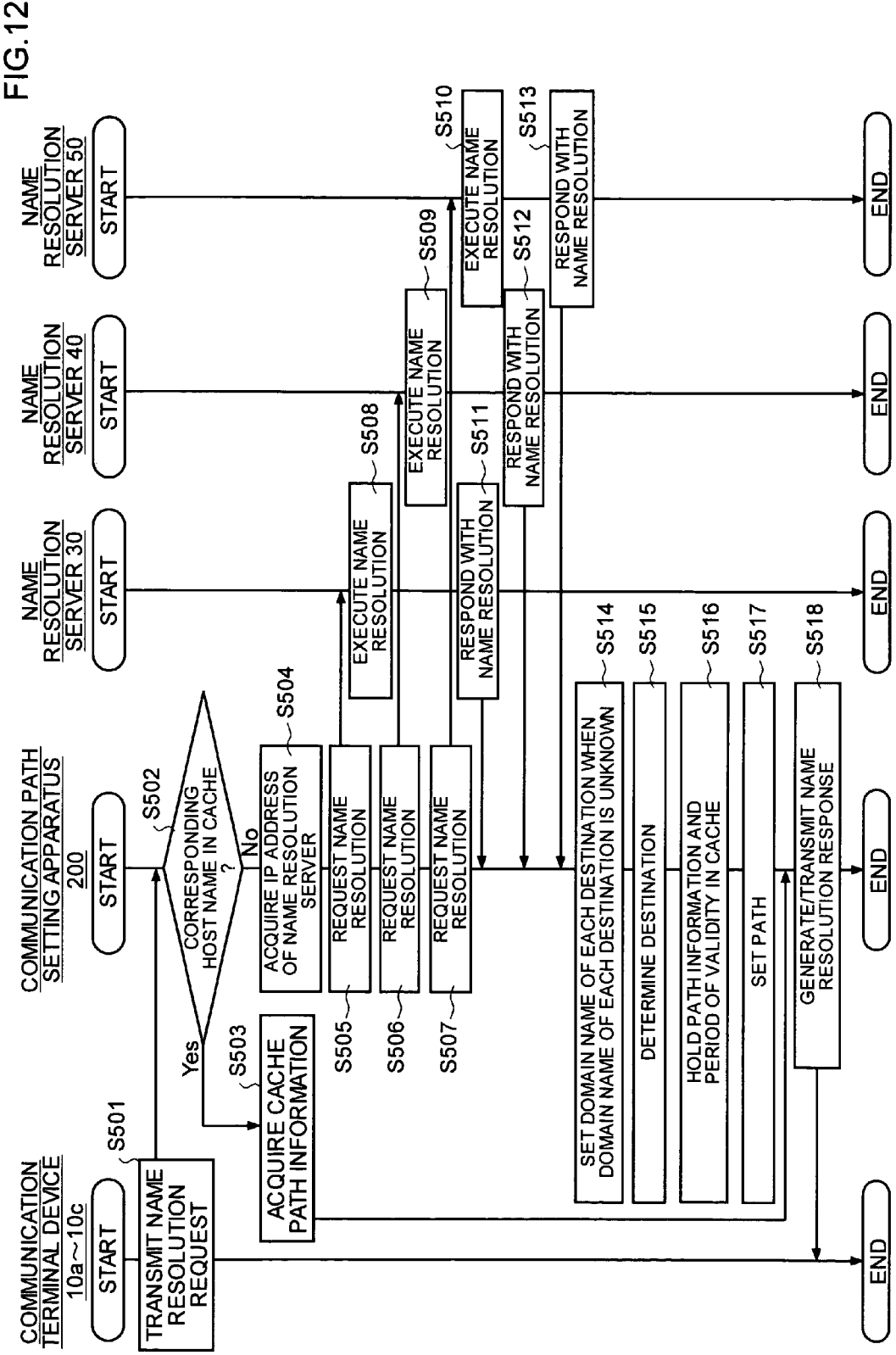
FIG. 12 is a flowchart that depicts the steps of setting the communication path of the communication path setting system shown in FIG. 2.

Next, the steps of setting the communication path of the communication path setting system shown in FIG. 2 are explained. FIG. 12 is a flowchart that depicts the steps of setting the communication path of the communication path setting system shown in FIG. 2. As shown in FIG. 12, the communication terminal devices 10a to 10c, in setting a communication path, transmit to the communication path setting apparatus 200 a request for a name resolution of the IP address corresponding to the host name of the destination (step S501).

The communication path setting apparatus 200 that has received the requests for name resolution of the destination from the communication terminal devices 10a to 10c checks to see whether the cache 205c contains a host name corresponding to the domain name of the name resolution request (step S502). When the cache 205c contains a host name corresponding to the domain name of the name resolution request (YES at step S502), the path information is acquired from the cache to generate the name resolution response for the name resolution requests received from the communication terminal devices 10a to 10c (step S503), a name resolution response is generated and the name resolution response thus generated is transmitted to the communication terminal devices 10a to 10c (step S518).

In the absence of the host name corresponding to the domain name of the name resolution request in the cache 205c (NO at step S502), on the other hand, the communication path setting apparatus 200 acquires the name resolution server IP address of connections 1, 2 and 3 from the connection status table data 205a (step S504). New name resolution requests each having destination IP addresses, which indicate the name resolution servers 30, 40, 50 of connections 1, 2 and 3 respectively, are generated from the name resolution requests received from the communication terminal devices 10a to 10c, and then are transmitted to the name resolution servers 30, 40, 50 at the same time (steps S505, S506, S507).

Further, the name resolution servers 30, 40, 50 that have received the name resolution requests from the communication path setting apparatus 200 executes the name resolution based on the name resolution requests (steps S508, S509, S510). Specifically, the data base of the name resolution servers 30, 40, 50 is searched for the IP address corresponding to the host name of the destination. The name resolution servers 30, 40, 50 then generate a name resolution response and transmits it to the communication path setting apparatus 200 (steps S511, S512, S513). When the domain name of each connection of the networks 70, 80, 90 is not contained in the connection status table 205a, the communication path setting apparatus 200 acquires the domain name of each connection from each connection and sets it in the connection status table data 205a (step S514).

The communication path setting apparatus 200 that has received the name resolution response from the name resolution servers 30, 40, 50 assigns the order of priority to the name resolution responses, and determines the destination in the particular order of priority (step S515). The communication path setting apparatus 200 assigns the order of priority to the name resolution responses based on the degree of analogy between the domain name of the name resolution response and the domain name set for the connection of the networks 70, 80, 90 and determines the destination in the particular order of priority. When the order of priority is assigned to the name resolution responses based on the degree of analogy and the destination cannot be determined in the particular order of priority, on the other hand, the communication path setting apparatus 200 assigns the order of priority to the name resolution responses on first-come-first-served basis and determines the destination in the particular order of priority.

As explained with reference to FIG. 9, the domain name of the name resolution responses and the domain names of connections 1, 2 and 3 are compared with each other in the descending order, and the name resolution response sharing a larger part of the domain name is defined to have a "higher degree of analogy". In the case shown in FIG. 9, the part shared by the domain name of the name resolution response received from the name resolution server 50 of connection 3 and the domain name of connection 3 is larger than the part shared by the domain name of the name resolution response received from the name resolution server 50 of connection 1 and the domain name of connection 1. Therefore, the name resolution response received from the name resolution server 50 of connection 3 has a higher degree of analogy and thus a higher order of priority than the name resolution response received from the name resolution server 50 of connection 1.

Figure 13:
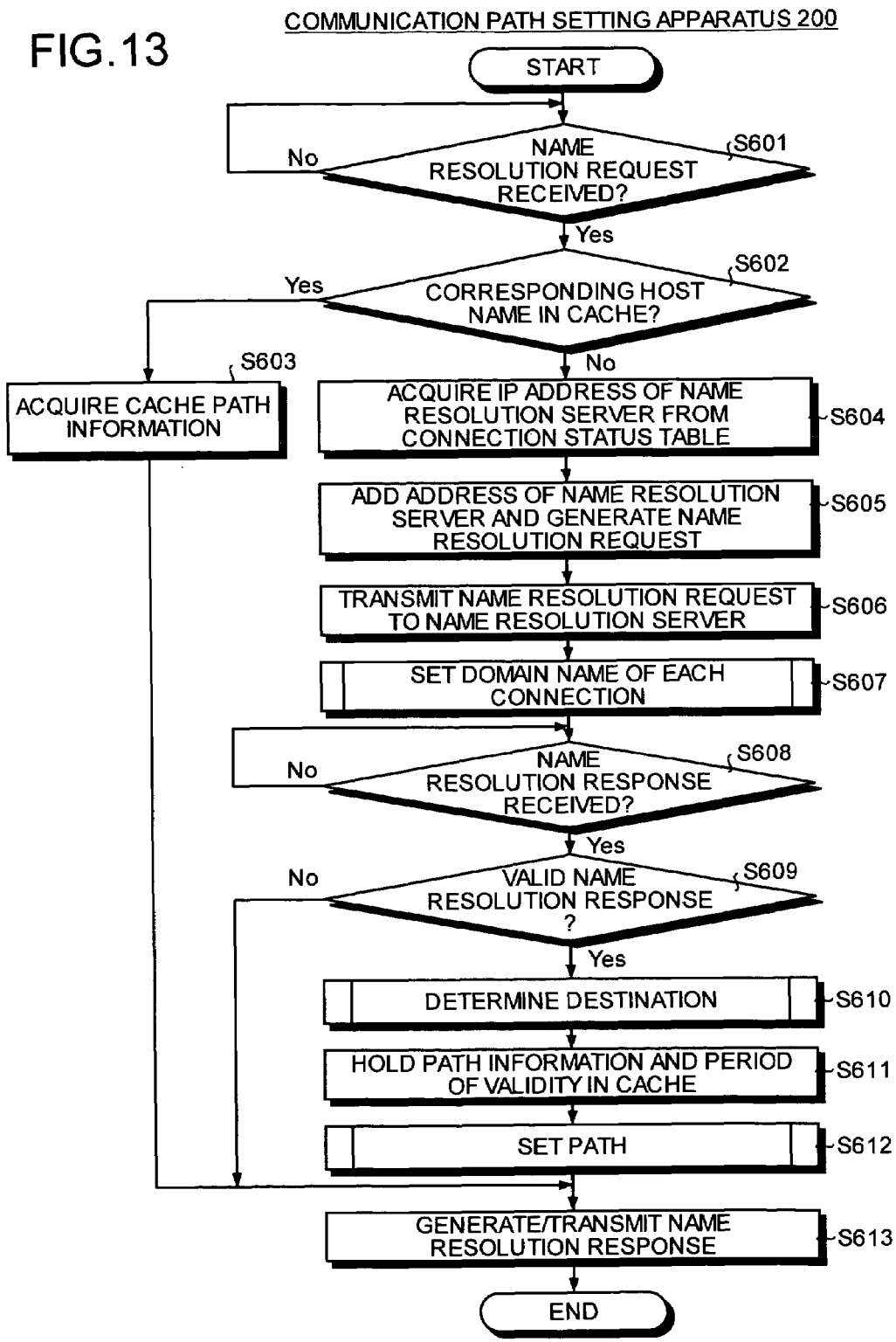
FIG. 13 is a flowchart that depicts the steps of setting the communication path of the communication path setting apparatus shown in FIG. 2.

Further, the communication path setting apparatus 200 holds the path information of the destination and the period of validity thus determined in the cache 205c (step S516). At the same time, the communication path setting apparatus 200 generates the routing table data 205b for setting the communication path to the destination and sets the path (step S517). Also, the communication path setting apparatus 200 generates a name resolution response containing the destination thus determined, and transmits the name resolution response thus generated to the communication terminal devices 10a to 10c (step S518). Next, the steps of setting the communication path of the communication path setting apparatus 200 shown in FIG. 2 are explained. FIG. 13 is a flowchart that depicts the steps of setting the communication path of the communication path setting apparatus 200 shown in FIG. 2. As shown in FIG. 13, the communication path setting apparatus 200 waits for the receipt of the requests for the name resolution of the destination from the communication terminal devices 10a to 10c (step S601).

Upon receipt of the requests for the name resolution of the destination from the communication terminal devices 10a to 10c, the communication path setting apparatus 200 checks whether the cache 205c has a host name corresponding to the domain name of the name resolution request (step S602). When the cache 205c has the domain name corresponding to the host name of the name resolution request (YES at step S602), the path information for generating the name resolution response to the name resolution request is acquired from the cache 205c (step S603). Then, the name resolution response is generated and transmitted to the communication terminal devices 10a to 10c (step S613).

In the absence of the host name corresponding to the domain name of the name resolution request in the cache 205c (NO at step S602), on the other hand, the communication path setting apparatus 200 acquires the IP address of the name resolution server of connections 1, 2 and 3 from the connection status table data 205a shown in FIG. 5 (step S604). Then, the address of the name resolution servers 30, 40, 50 is added to the name resolution requests received from the communication terminal devices 10a to 10c thereby to generate a name resolution request (step S605). The name resolution requests thus generated are transmitted to the name resolution servers 30, 40, 50 at the same time (step S606). Further, in the absence of the domain name of each connection of the networks 70, 80, 90 in the connection status table data 205a, the communication path setting apparatus 200 acquires the domain name of each connection from each connection and sets it in the connection status table data 205a (step S607).

Figure 14:
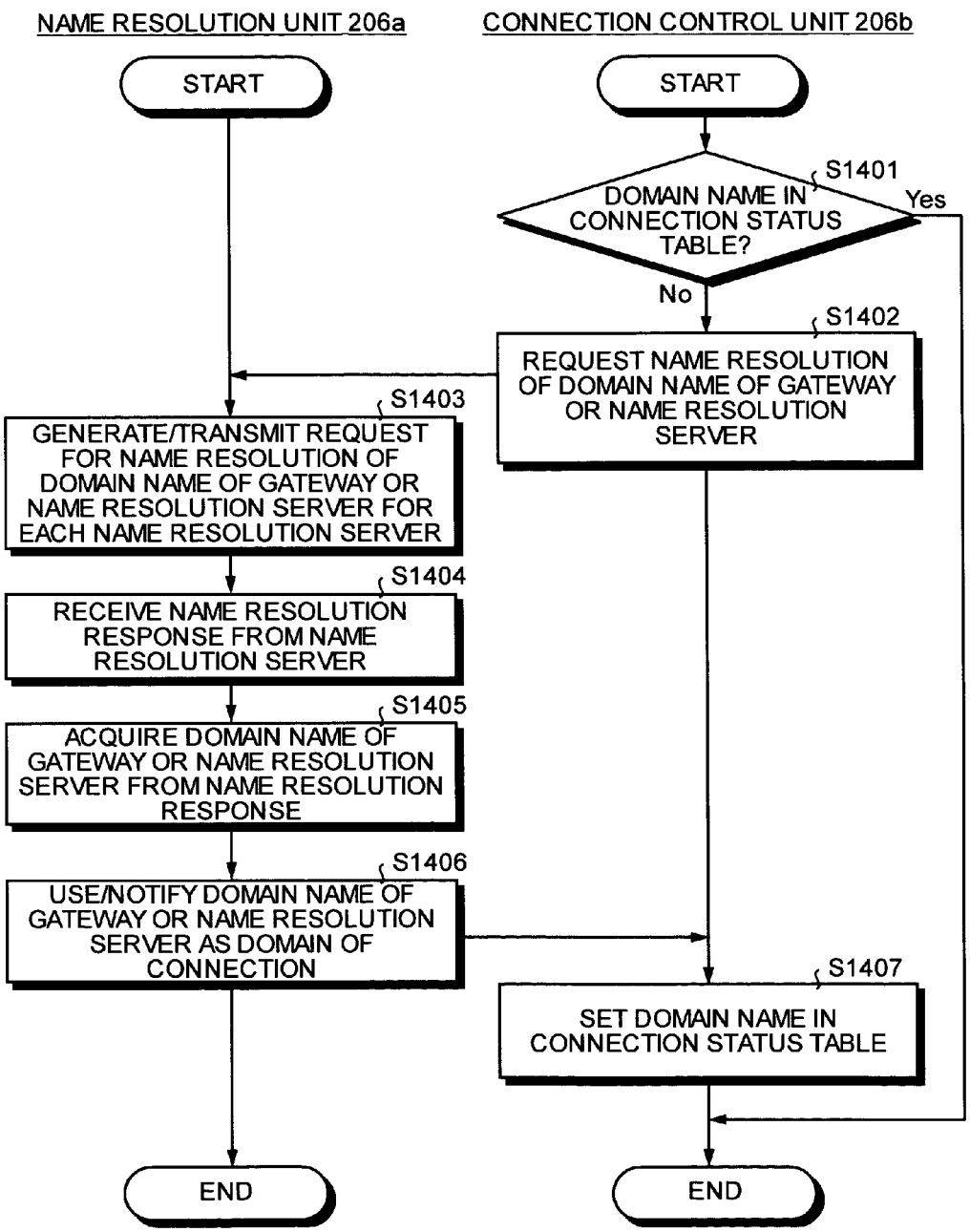
FIG. 14 is a flowchart that depicts in more detail the steps of setting the domain name of the communication path setting apparatus shown in FIG. 13.

The steps of setting the domain name of the communication path setting apparatus 200 shown in FIG. 2 are explained in more detail. FIG. 14 is a flowchart for explaining the steps of setting the domain name of the communication path setting apparatus 200 shown in FIG. 2. As shown in FIG. 14, the connection control unit 206b checks to see whether the connection status table data 205a shown in FIG. 3 has the domain name (step S1401). When the connection status table data 205a has the domain name (YES at step S1401), the process is ended.

When the connection status table data 205a has no domain name (NO at step S1401), on the other hand, the name resolution request for the domain name of the name resolution servers 30, 40, 50 or the gateway existing in the networks 70, 80, 90 is issued to the name resolution request generator 206a1 (step S1402).

The name resolution request generator 206a1, upon receipt of the name resolution request for the domain name of the name resolution servers 30, 40, 50 or the gateway from the connection control unit 206b, generates a name resolution request for the domain name of each of the name resolution servers 30, 40, 50 or the gateway and transmits it to each name resolution server (step S1403).

Further, the destination determiner 206a2 receives the name resolution response transmitted by the name resolution servers 30, 40, 50 in response to the name resolution request (step S1404), and acquires the domain name of the name resolution servers 30, 40, 50 or the gateway from the name resolution response received (step S1405). The domain name for the name resolution servers 30, 40, 50 or the gateway thus received is used as a domain name of the connection and notified to the connection control unit 206b (step S1406). Further, the connection control unit 206b sets the notified domain name in the connection status table data 205a (step S1407).

Returning to FIG. 13, the communication path setting apparatus 200 waits for the arrival of the name resolution responses to the name resolution requests transmitted to the name resolution servers 30, 40, 50 (step S608). The name resolution unit 206a of the communication path setting apparatus 200 checks to see whether the name resolution responses received from the name resolution servers 30, 40, 50 include a valid name resolution response (step S609). In the absence of a valid name resolution response (NO at step S609), the name resolution response generator 206a3 generates a response indicating the absence of a destination, and transmits the response thus generated to the communication terminal device 10a, 10b or 10c from the internal interface unit 201 (step S613). Incidentally, the valid name resolution response is defined as a name resolution response containing an IP address corresponding to the host name.

In the case shown in FIG. 7, for example, none of the name resolution responses received from the name resolution servers 30, 40, 50 of connections 1, 2 and 3 contains an IP address. Therefore, the name resolution response generator 206a3 generates a response indicating the absence of a destination, and transmits the response thus generated to the communication terminal device 10a, 10b or 10c from the internal interface unit 201.

Figure 15:
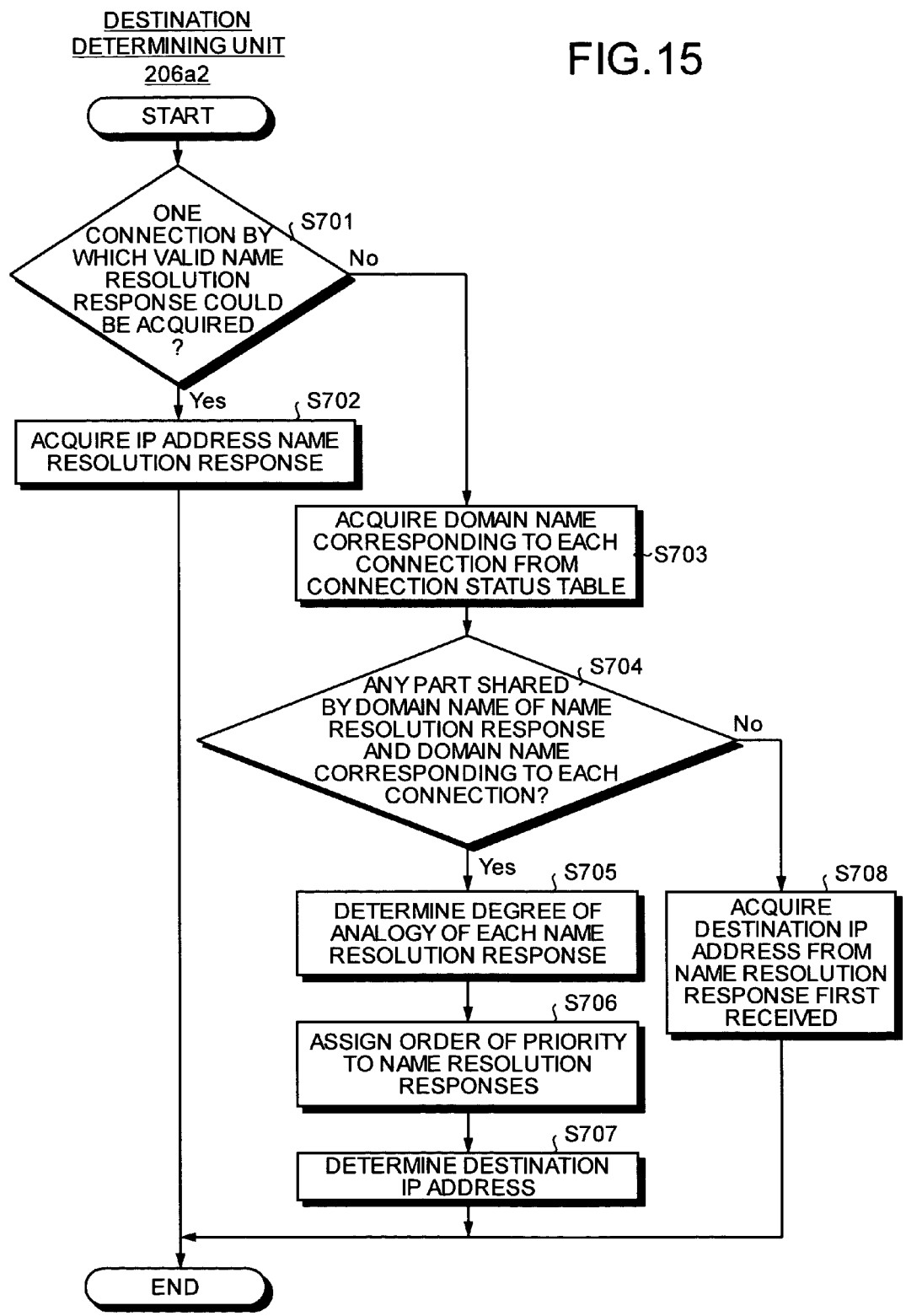
FIG. 15 is a flowchart that depicts in more detail the steps of determining the destination of the communication path setting apparatus shown in FIG. 13.

When a valid name resolution response exists (YES at step S609), on the other hand, the destination determiner 206a2 assigns the order of priority to the name resolution responses and determines the destination in the particular order of priority (step S610). The steps of determining the destination shown in FIG. 13 is described in more detail. FIG. 15 is a flowchart that depicts in more detail the destination determining process of the communication path setting apparatus 200 shown in FIG. 13.

As shown in FIG. 15, the destination determiner 206a2 checks to see whether the connection by which a valid name resolution response could be acquired is one (step S701). When the connection by which a valid name resolution response could be acquired is one in number (YES at step S701), the destination determiner 206a2 acquires the IP address from the name resolution response (step S702).

In the case shown in FIG. 8, for example, the connection by which the name resolution response could be acquired is only connection 1, and therefore the destination determiner 206a2 acquires the three IP addresses of "133.196.18.1", "133.196.18.2" and "133.196.18.3" as destination IP addresses.

When the connection by which a valid name resolution response could be acquired is not one (NO at step S701), on the other hand, the destination determiner 206a2 acquires the domain name corresponding to each of connections 1, 2 and 3 from the connection status table data 205a shown in FIG. 5 (step S703). The destination determiner 206a2 then checks to see whether the domain name of the name resolution response and the domain name corresponding to each connection share some part (step S704).

In the case shown in FIG. 9, for example, a valid name resolution response could be acquired not by one but two connections 1 and 3. Therefore, the destination determiner 206a2 checks to see whether any part is shared by the domain name "hone.netthree.co.jp" acquired from the host name of the name resolution response and the domain names "netone.co.jp", "nettwo.co.jp", "netthree.co.jp" corresponding to connections 1, 2 and 3, respectively.

When any part is shared by the domain name of the name resolution response and the domain names corresponding to the respective connections (YES at step S704), the destination determiner 206a2 determines the degree of analogy between each name resolution response and the domain name corresponding to each of connections 1, 2 and 3 (step S705). Based on the degree of analogy thus determined, the name resolution responses are assigned the order of priority (step S706), and the destination IP addresses are determined in the particular order of priority (step S707).

When no part is shared by the domain name of the name resolution response and the domain names corresponding to the connections (NO at step S704), on the other hand, the destination determiner 206a2 acquires the destination IP address from the name resolution response first received (step S703).

Returning to FIG. 13, the cache manager 206a4 holds in the cache 205c the path information including the IP address of the destination determined by the destination determiner 206a3, the IP address of the gateways existing in the networks and the interface name of itself and the period of validity of the path information (step S611). The path setting unit 206c updates the routing table data 205b based on the path information and sets a communication path (step S612). The name resolution response generator 206a3 generates a name resolution response including the destination determined by the destination determiner 206a2 and transmits the name resolution response thus generated to the communication terminal device 10a, 10b or 10c through the internal interface unit 201 (step S613).

As shown in FIGS. 10 and 11, for example, the path setting unit 206c sets a communication path by determining the destination IP address and the corresponding gateway IP address of the networks from the routing table data 205b.

Figure 16:
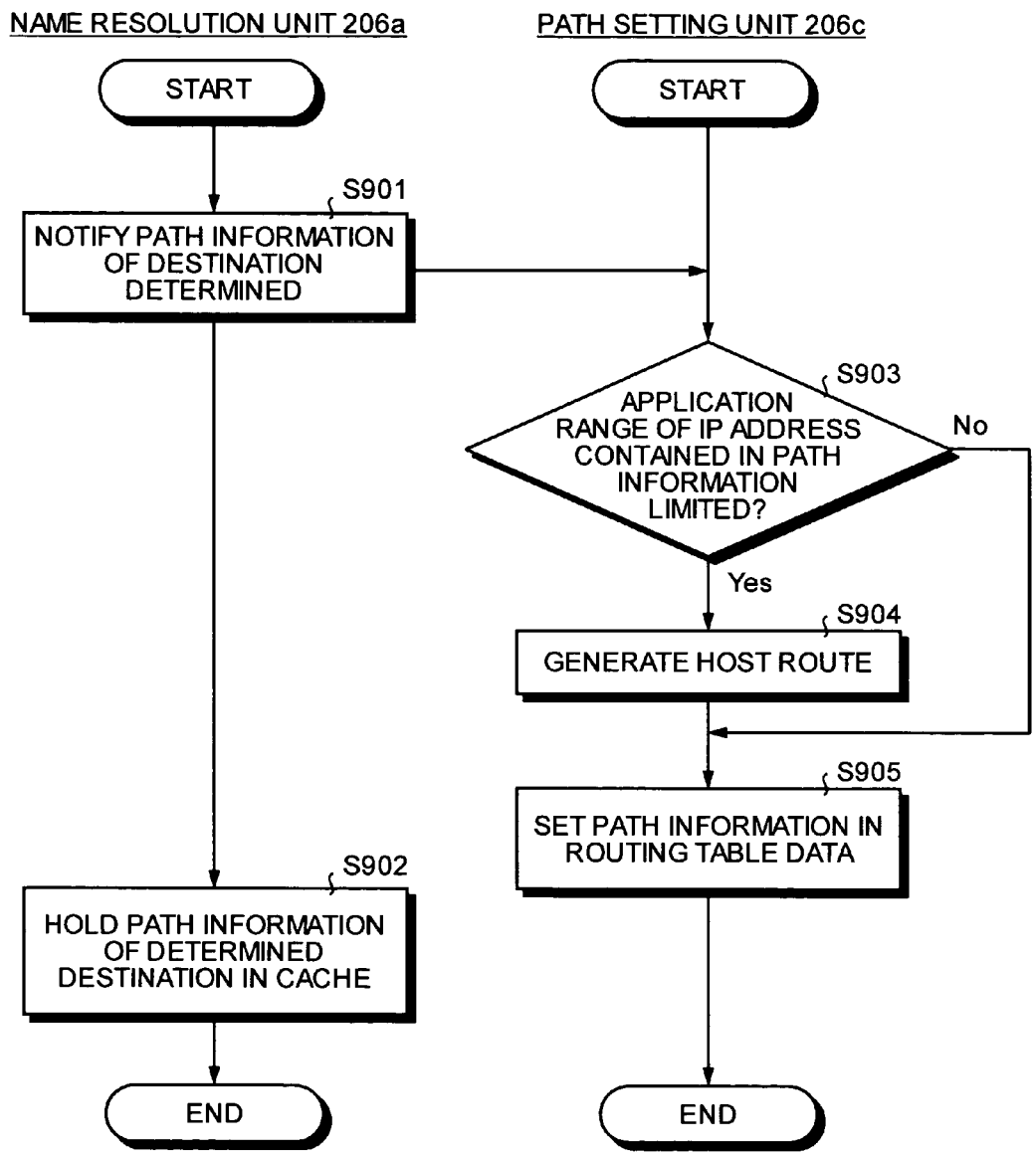
FIG. 16 is a flowchart that depicts in more detail the steps of setting the path in the communication path setting apparatus shown in FIG. 13.

The steps of setting the path by the communication path setting apparatus 200 shown in FIG. 13 are explained in more detail. FIG. 16 is a flowchart that depicts in more detail the steps of setting the path by the communication path setting apparatus 200 shown in FIG. 13.

As shown in FIG. 16, the name resolution unit 206a notifies the path setting unit 206c of the path information of the destination of the name resolution response determined by the destination determiner 206a2 (step S901). The name resolution unit 206a holds in the cache 205c the cache information including the domain name of the destination determined, the path information, the period of validity of the path information and the information for determining whether the period of validity has expired or not (step S902). Further, the name resolution unit 206a checks to see whether the IP address contained in the path information of the destination is address information like the private address of IPv4, the link local address of IPv6 or the network address which has a limited application range on the network (step S903).

When the IP address contained in the path information is not limited in the range of application on the network (NO at step S903), the path information is set in the routing table data 205b (step S905). When the IP address contained in the path information is limited in the application range on the network (YES at step S903), on the other hand, a corresponding host route is generated from the IP address and the address information of the gateways existing in a plurality of the networks (step S904), and the path information is set in the routing table data 205b (step S905).

Figure 17:
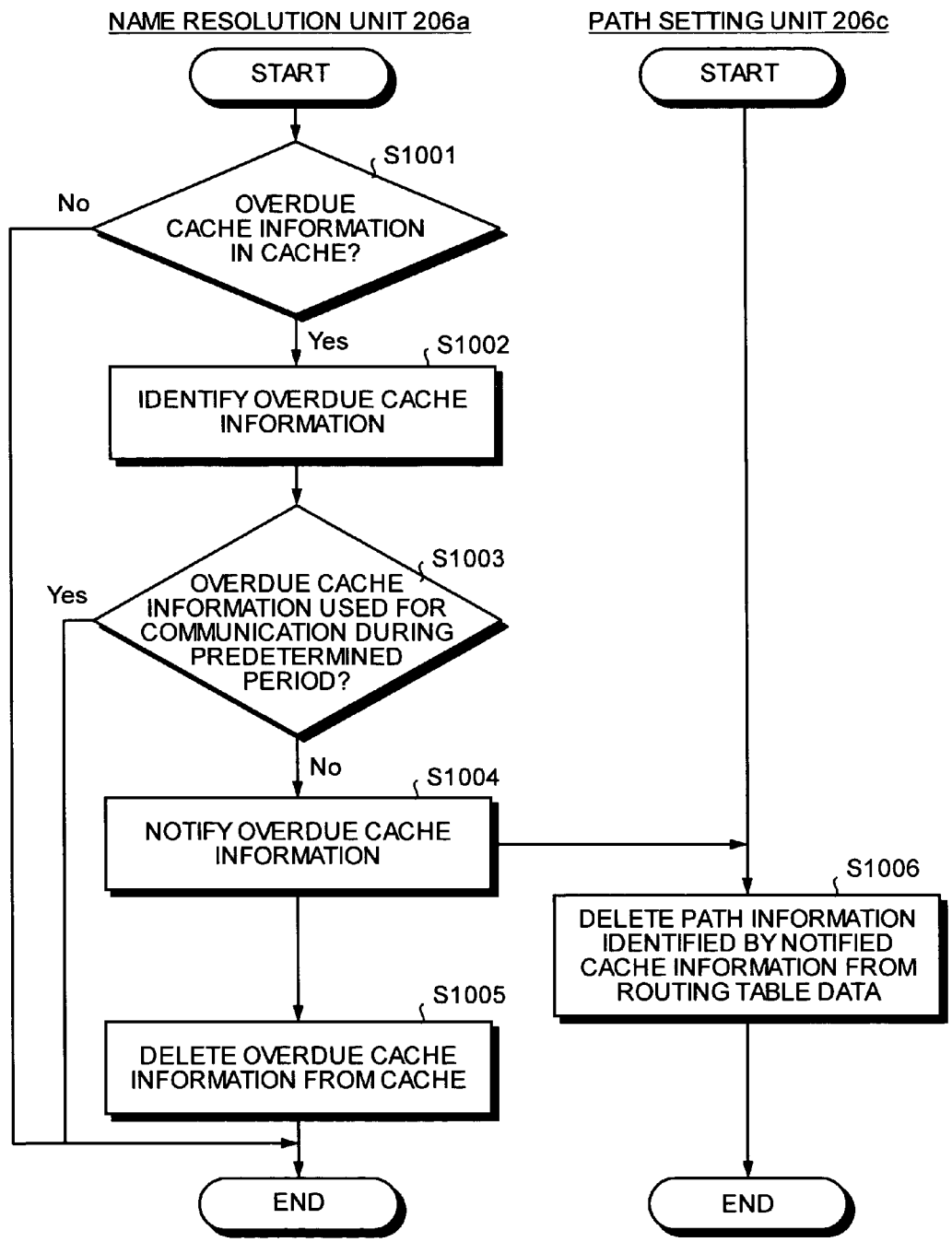
FIG. 17 is a flowchart that depicts the steps of path deletion of the communication path setting apparatus shown in FIG. 2.

Next, the path deleting process of the communication path setting apparatus shown in FIG. 2 is explained. FIG. 17 is a flowchart that depicts the path deleting steps for the communication path setting apparatus shown in FIG. 2. As shown in FIG. 17, the cache manager 206a4 of the name resolution unit 206a checks to see whether the cache 205c has the cache information of which the period of validity has expired (step S1001). When the cache information of which the period of validity has expired is not contained in the cache 205c (NO at step S1001), the name resolution unit 206a ends the process.

When the cache 205c contains the cache information of which the period of validity has expired (YES at step S1001), on the other hand, the cache manager 206a4 notes "invalid" in the "valid/invalid" column to discriminate whether the period of validity of the cache information of the cache 205c shown in FIG. 6 has expired (step S1002). Incidentally, the name resolution unit 206a uses no cache information determined as "invalid" for the name resolution.

The cache manager 206a4 then checks to see whether the cache information of which the period of validity has expired is used for communication during a predetermined period (step S1003). When the cache information of which the period of validity has expired is used for communication during a predetermined period (YES at step S1003), this process is ended.

When the cache information of which the period of validity has expired is not used for communication during a predetermined period (NO at step S1003), on the other hand, the cache manager 206a4 notifies the path setting unit 206c that the period of validity of the cache information has expired (step S1004). Then the cache manager 206a4 deletes the cache information of which the period of validity has expired from the cache 205c (step S 005). The path setting unit 206c deletes from the routing table 205b the path information identified from the cached information notified (step S1006).

As described above, according to the first embodiment, based on the request for the name resolution of the destination received from the communication terminal devices 10a to 10c, name resolution requests are generated with each of the name resolution servers 30, 40, 50 existing in the networks 70, 80, 90 as an address, and the name resolution requests thus generated are transmitted. The name resolution responses received from the name resolution servers 30, 40, 50 of the networks 70, 80, 90 in response to the name resolution requests are assigned the order of priority, and the IP address of the destination is determined in the particular order of priority. A routing table is generated from the path information including the IP address of the destination, the IP addresses of the gateways existing in the networks 70, 80, 90 and the interface name of itself thereby to set a path. Thus, the proper communication path can be easily set without the routing protocol or the path setting operation on the part of the user.

Also, based on the degree of analogy between the domain name of the name resolution response and the domain name set for the connection of the networks 70, 80, 90, the name resolution responses are assigned the order of priority, and the destination is determined from the name resolution responses in the order of priority. As a result, a destination near to any one of the domains of the networks 70, 80, 90 can be determined.

Also, when the name resolution responses are assigned the order of priority based on the degree of analogy and the destination cannot be determined in the particular order of priority from the name resolution responses, then the name resolution responses are assigned the order of priority on first-come-first-served basis and the destination is determined in the order of priority from the name resolution responses. Therefore, the communication terminal devices 10a to 10b can easily acquire the destination without regard to the degree of analogy of the domain name.

The name resolution requests for the domain name of the name resolution servers 30, 40, 50 or the gateways existing in the networks 70, 80, 90 are generated and transmitted to the name resolution servers 30, 40, 50 for each connection, and the domain name of the name resolution servers 30, 40, 50 or the gateways included in the name resolution responses received from the name resolution servers 30, 40, 50 in response to the name resolution requests is determined as the domain name set for each connection of the networks 70, 80, 90. Even when the domain name is unknown for the connection to the networks 70, 80, 90, therefore, the domain name for connection to the networks 70, 80, 90 can be easily set.

Also, when the IP address contained in the path information is limited in the application range on the network, a corresponding host route is generated from the particular limited IP address and the IP addresses of the gateways existing in the networks 70, 80, 90 and set in the routing table data 205b. When a request for communication to the destination is received from the communication terminal devices 10a to 10c, therefore, a path which positively leads to the destination can be set.

The cache manager 206a4, upon determination that the period of validity of the cache information stored in the cache 205c has expired and the cache information has not been used during a predetermined period, requests the path setting unit 206c to delete the path information corresponding to the cache information from the routing table data 205b. In this way, the cache information is deleted. The path setting unit 206c, upon receipt of a request from the cache manager 206a4 to delete the path information from the routing table data 205b, deletes the path information from the routing table data 205b. These processes eliminate the need of an excessive capacity of the cache 205c and the routing table data 205b.

Also, the name resolution response containing the destination is generated and transmitted to the communication terminal devices 10a to 10c. Therefore, the communication terminal devices 10a to 10c can easily acquire the destination.

Further, in the absence of the name resolution response returned from the name resolution servers of the networks, a response indicating the absence of the destination is generated and transmitted to the communication terminal devices 10a to 10c. Thus, the absence of the destination is easily understood.

As explained in the first embodiment, when the order of priority of the name resolution responses cannot be determined based on the degree of analogy between the domain name of the name resolution responses and the domain names assigned to the connection of the networks 70, 80, 90, the order of priority of the name resolution responses is determined on first-come-first-served basis. Nevertheless, the invention is not limited to this method, but other criterion may be employed. For example, the order of priority may be determined based on the round-trip time obtained by observing the communication using the networks 70, 80, 90 for a predetermined time, the order of entry into the connection status table data 205a, or the order of priority predetermined by the user.

In the first embodiment, the case in which the communication is not automatically connected or disconnected is explained as shown in FIG. 5. This invention, however, is not limited to such a case. As shown in FIG. 4, for example, the invention is applicable with equal effect to the case in which the communication is connected again after automatic disconnection and the name resolution requests are generated and transmitted to the name resolution servers 30, 40, 50 of the networks 70, 80, 90 based on the name resolution requests received from the communication terminal devices 10a to 10c, or the case in which the name resolution requests are generated and transmitted to the name resolution servers 30, 50 of the networks 70, 90, except for the disconnected communication, based on the name resolution requests received from the communication terminal devices 10a to 10c.

According to the first embodiment, the communication path setting apparatus 200 was explained with reference to the case in which a plurality of name resolution requests are transmitted at the same time to the name resolution servers 30, 40, 50. Nevertheless, the invention is not limited to such a case, and after waiting for the name resolution responses from the name resolution servers 30, 40, 50, a plurality of name resolution requests may be transmitted sequentially.

Also, according to the first embodiment, when the address information of the destination determined from the name resolution responses of the name resolution servers 30, 40, 50 are limited in the range of application on the network, the communication path setting apparatus 200 generates a host route and sets it in the routing table data 205*b*.

The first embodiment refers to a case in which the communication path setting apparatus 200 is used with the communication path setting system that sets a communication path between the networks of a plurality of internet providers and contents providers. In the process, when the address information of the destination determined from the name resolution responses of the name resolution servers 30, 40, 50 are limited in the application range on the network, the communication path setting apparatus 200 generates a host route and sets it in the routing table data 205*b*. This invention, however, is not limited to such a case, but when the routing table data 205*b* includes the address information using the same connection, the communication path setting apparatus 200 aggregates all the path information using the same connection and sets the aggregated address information in the routing table data 205*b* in place of all the address information using the same connection.

According to a second embodiment, a case is explained in which the communication path setting apparatus aggregates all the address information using the same connection and sets the aggregated address information in the routing table data 205*b* in place of all the address information using the same connection.

Figure 18:
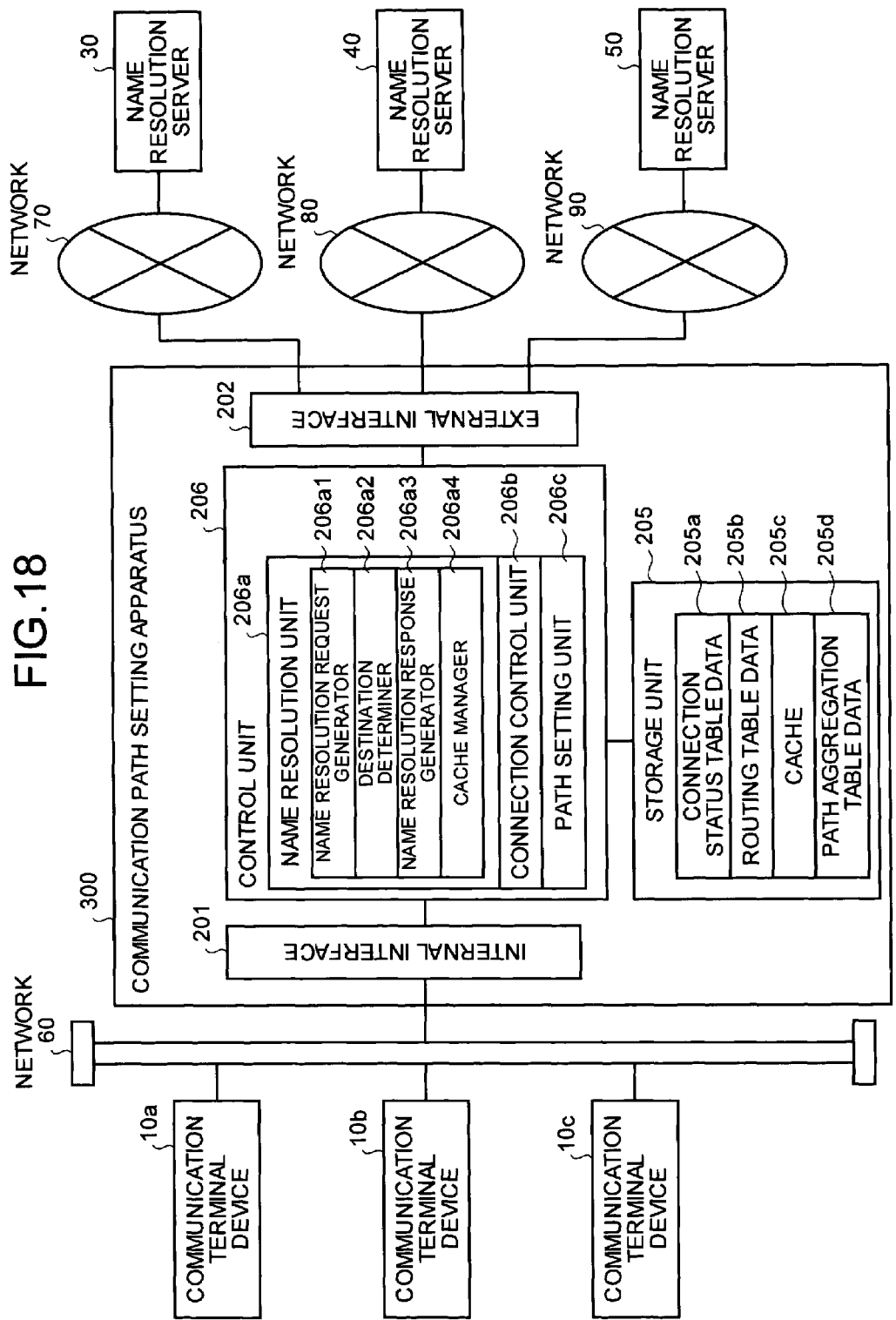
FIG. 18 is a function block diagram that depicts a configuration of a communication path setting system according to a second embodiment.

First, the configuration of the communication path setting system according to the second embodiment is explained. FIG. 18 is a function block diagram that depicts a configuration of a communication path setting system according to the second embodiment. In the function block diagram of FIG. 18, the path aggregation table data 205*d* is simply added to the storage unit 205 in the function block diagram of FIG. 2, and therefore the path aggregation table data 205*d* is explained below. FIG. 19 is a diagram that depicts an example of the path aggregation table data 205*d* of the communication path setting apparatus 300 shown in FIG. 18.

As shown in FIG. 19, the path aggregation table data 205*d* includes the destination IP addresses, the aggregated IP address and the presence or absence of a deletion request. The aggregated IP address is an aggregation of the destination IP addresses. Each destination IP address is determined by the destination determiner 206*a*2 and uses the same connection of a plurality of the networks 70, 80, 90. The presence or absence of a deletion request, that is, "the deletion requested or not", on the other hand, is the information indicating whether the deletion of a destination IP address is requested from the cache manager 206*a*4, and the "not requested" indicates the absence of such a deletion request, while the "requested" the presence of the request.

As shown in FIG. 19, the aggregated IP address "133.196.18.0/30" is an aggregation of four destination IP addresses "133.196.18.0/32", "133.196.18.1/32", "133.196.18.2/32" and "133.196.18.3/32" that use the same connection. The four destination IP addresses shown in FIG. 19, for example, have not yet received any deletion request from the cache manager.

Figure 20:
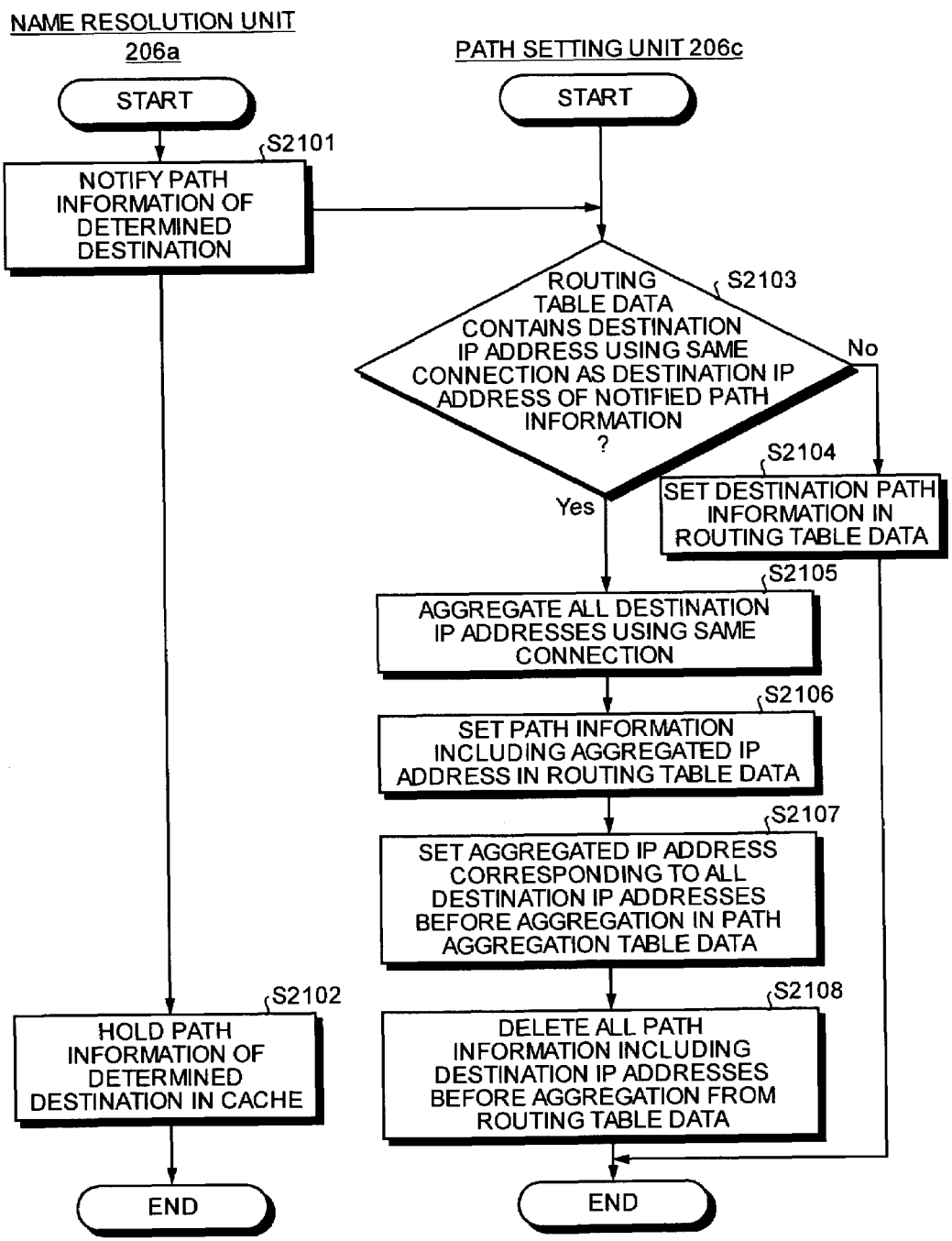
FIG. 20 is a flowchart that depicts the steps of setting the path in the communication path setting apparatus shown in FIG. 18.

Next, the communication path setting steps and the communication path deleting steps of the communication path setting apparatus 300 shown in FIG. 18 is explained. FIG. 20 is a flowchart that depicts the communication path setting steps of the communication path setting apparatus 300 shown in FIG. 18.

As shown in FIG. 20, the name resolution unit 206*a* notifies the path setting unit 206*c* of the path information of the destination of the name resolution response determined by the destination determiner 206*a*2 (step S2101). The name resolution unit 206*a* holds in the cache 205*c* the cache information including the domain name of the destination determined, the path information, the period of validity of the path information and the information as to whether the period of validity has expired (step S2102). Further, the path setting unit 206*c* checks to see whether the routing table data 205*b* contains any destination IP address which uses the same connection as the destination IP address of the path information notified (step S2103). When the routing table data 205*b* contains no destination IP address using the same connection as the destination IP address of the path information notified (NO at step S2103), the notified path information of the destination is set in the routing table data 295*b* (step S2104).

When the routing table data 205*b* contains any destination IP address which uses the same connection as the destination IP address of the notified path information (YES at step S2103), on the other hand, the path setting unit 206*c* aggregates all the destination IP addresses which use the same connection (step S2105), and sets the path information including the aggregated IP address in the path aggregation table data 205*b* (step S2106). Then, the path setting unit 206*c* sets all the destination IP addresses to be aggregated and the corresponding aggregated IP address in the path aggregation table data 205*d* (step S2107). Further, the path setting unit 206*c* deletes all the path information including the destination IP addresses before aggregation from the routing table data 205*b* (step S2108).

Figure 21:
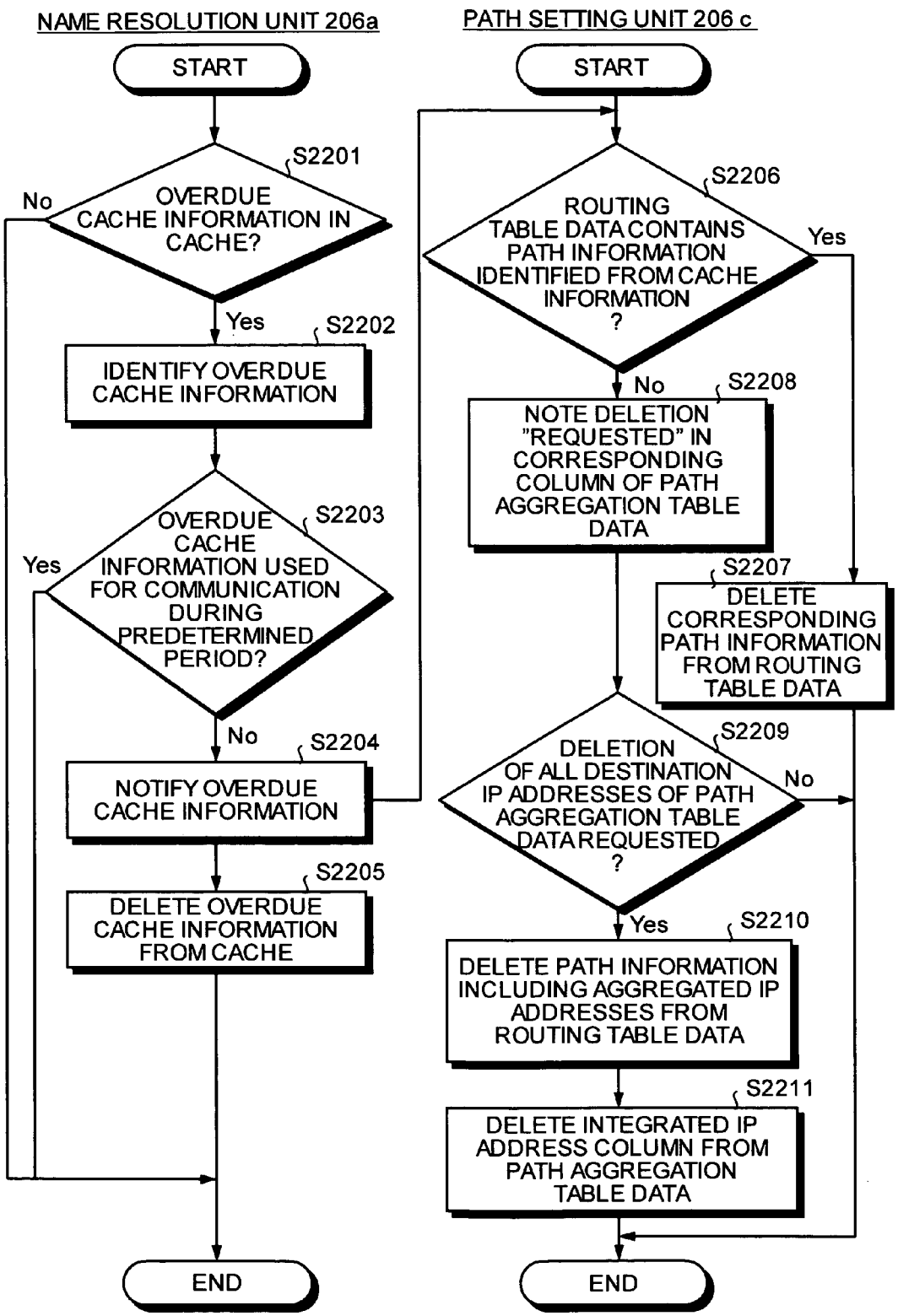
FIG. 21 is a flowchart that depicts the steps of deleting the communication path in the communication path setting apparatus shown in FIG. 18.

Next, the communication path deleting steps of the communication path setting apparatus 300 shown in FIG. 18 are explained. FIG. 21 is a flowchart that depicts the communication path deleting steps of the communication path setting apparatus 300 shown in FIG. 18. As shown in FIG. 21, the cache manager 206*a*4 of the name resolution unit 206*a* checks to see whether the cache 205*c* contains the overdue cache information of which the period of validity has expired (step S2201). In the absence of the overdue cache information in the cache 205*c* (NO at step S2201), the name resolution unit 206*a* ends the process.

In the presence of the overdue cache information in the cache 205*c* (YES at step S2201), on the other hand, the cache manager 206*a*4 notes "valid" in the "valid/invalid" column indicating whether the path information of the cache 205*c* has passed the period of validity as shown in FIG. 6 (step S2202). Incidentally, the name resolution unit 206*a* does not use the path information determined as invalid for the name resolution.

The cache manager 206*a*4 checks to see whether the overdue cache information that has passed the period of validity has been used for communication during a predetermined period (step S2203). When the overdue cache information is used during the predetermined period (YES at step S2203), the process is terminated.

When the overdue path information is not used for communication during the predetermined period (NO at step S2203), the cache manager 206*a*4 notifies the path setting unit 206*c* of the cache information that has passed the period of validity (step S2204) and deletes the overdue cache information from the cache (step S2205).

The path setting unit 206*c* checks to see whether the routing table data 205*b* contains the path information determined from the cache information notified by the cache manager 206*a*4 (step S2206). When the path information determined from the cache information is contained in the routing table data 205*b* (YES at step S2206), the corresponding path information is deleted from the routing table data 205*b* (step S2207).

When path information determined from the cache information is not contained in the routing table data 205*b* (NO at step S2206), the path setting unit 206*c* notes "requested" in the corresponding column of the path aggregation table data 205*d* for the destination IP address included in the cache information that has passed the period of validity (step S2208). The path setting unit 206*c* then checks to see whether the deletion of all the destination IP addresses of the path aggregation table data 205*d* is "requested" (step S2209).

When the deletion of all the destination IP addresses of the path aggregation table data 205*d* is "requested" (YES at step S2209), the path setting unit 206*c* deletes the path information including the aggregated IP address from the routing table data 205*b* (step S2210). The path setting unit 206*c* deletes the column of the aggregated IP address of the path aggregation table data 205*d* (step S2211). When the deletion of all the destination IP addresses of the path aggregation table data 205*d* is "not requested" (NO at step S2209), the process is ended.

As described above, according to the second embodiment, when the routing table data 205*b* contains the IP address of the destination which uses the same connection as the IP address of the destination determined by the destination determiner 206*a*2, the IP addresses of all the destinations using the same connection are aggregated into and replaced with the aggregated IP address. Therefore, the cache 205*c* and the routing table data 205*c* require no excessively large capacity.

When the routing table 20 contains the path information of which the deletion is requested by the cache manager 206*a*4, the path setting unit 206*c* deletes the path information from the routing table data 205*b*, or when the routing table data 205*b* contains no path information and the deletion of all the path information including the destination IP addresses aggregated into the aggregated IP address is requested by the cache manager 206*a*4, the path information including the aggregated IP address are deleted from the routing table data 205*b*. As a result, an excessive capacity is not required of the cache 205*c* and the routing table data 205*b*.

Also, according to the second embodiment, when the routing table data 205*b* contains the address information using the same connection, the communication path setting apparatus 200 aggregates all the address information using the same connection and sets an aggregated IP address in the routing table data 205*b* in place of all the IP addresses using the same connection. This invention, however, is not limited to such a method, but the functions of the first and second embodiments can be combined with equal effect.

The first and second embodiments refer to a case in which the communication path setting apparatus according to the invention is used for a communication path setting system that sets a communication path between the networks of a plurality of internet providers and contents providers.

A third embodiment, on the other hand, concerns a case in which a communication path is set by the user having a dialogue with the communication path setting apparatus 200 through a Web browser of the communication terminal devices 10*a* to 10*c* in the same communication path setting system as in the first embodiment.

Figure 22:
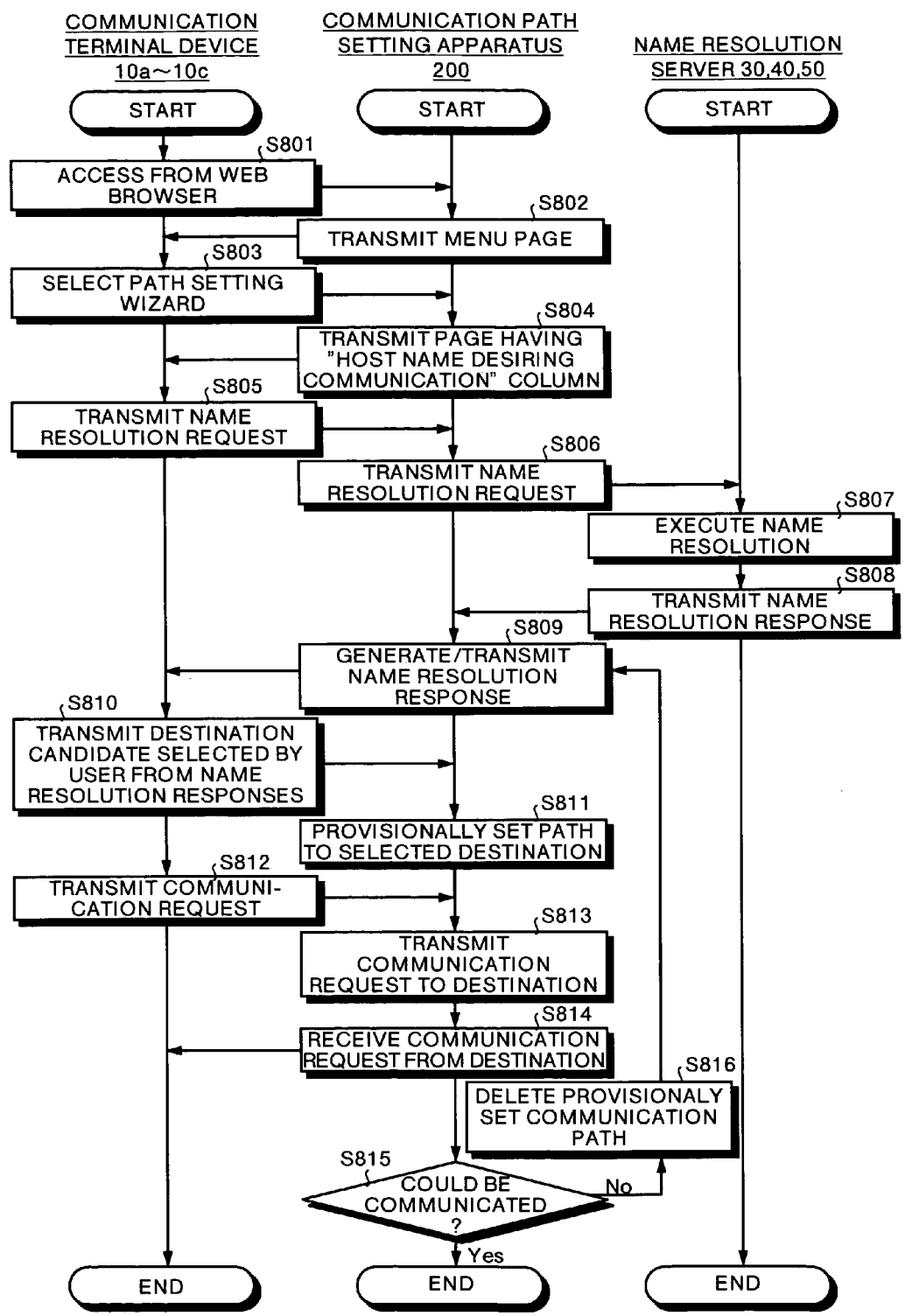
FIG. 22 is a flowchart that depicts the steps of setting a communication path in the communication path setting system according to the third embodiment.

The communication path setting system according to the third embodiment is identical with the system according to the first embodiment except that the communication terminal devices 10*a* to 10*c* according to the third embodiment have a Web browser. The communication path setting process for the communication path setting system according to the third embodiment is explained. FIG. 22 is a flowchart that depicts the communication path setting process for the communication path setting system according to the third embodiment. As shown in FIG. 22, the communication terminal devices 10*a* to 10*c* access the communication path setting apparatus 200 from the Web browser (step S801).

The communication path setting apparatus 200 receives the access of the communication terminal devices 10*a* to 10*c* and transmits the menu page to the communication terminal devices 10*a* to 10*c* (step S802). Further, the communication terminal devices 10*a* to 10*c* select the path setting wizard from the menu page thus received (step S803).

Then, the communication path setting apparatus 200, based on the selection of the path setting wizard by the communication terminal devices 10*a* to 10*c*, transmits the page having the "host name desiring communication" column to the communication terminal devices 10*a* to 10*c* (step S804). Then, the communication terminal devices 10*a* to 10*c* note the host name in the "host name desiring communication" column, and transmits the request for name resolution of the received host name to the communication path setting apparatus 200 (step S805).

Further, the communication path setting apparatus 200, upon receipt of the name resolution requests from the communication terminal devices 10*a* to 10*c*, generates new name resolution requests each having destination IP addresses, which indicate a plurality of the name resolution servers 30, 40, 50 respectively, from the name resolution requests received and transmits it to the name resolution servers 30, 40, 50 (step S806). The name resolution servers 30, 40, 50, upon receipt of the name resolution request from the communication path setting apparatus 200, executes the name resolution of the IP address corresponding to the host name of the name resolution request (step S807), and transmits a name resolution response containing the result of the name resolution to the communication path setting apparatus 200 (step S808).

Further, the communication path setting apparatus 200 assigns the order of priority to the name resolution responses received from the name resolution servers 30, 40, 50, determines the destinations in the particular order of priority from the name resolution responses, generates a name resolution response containing the destination determined, and transmits it to the communication terminal devices 10*a* to 10*c* (step S809).

In the communication terminal devices 10*a* to 10*c*, the destination IP address selected by the user from the name resolution responses received from the communication path setting apparatus 200 is transmitted to the communication path setting apparatus 200 as a destination candidate (step S810). Further, the communication path setting apparatus 200 provisionally sets a path to the destination IP address received from the communication terminal devices 10*a* to 10*c* (step S811).

The communication terminal devices 10*a* to 10*c* transmit a request for communication to the destination IP address (step S812). Further, the communication path setting apparatus 200, upon receipt of a communication request to the destination IP address from the communication terminal devices 10*a* to 10*c*, transmits the communication request received to the destination IP address (step S813). Then, the communication path setting apparatus 200, upon receipt of the communication response from the destination IP address, transmits the communication response received to the communication terminal devices 10*a* to 10*c* (step S814).

Further, the communication path setting apparatus 200, upon receipt of the communication response from the destination IP address or upon lapse of a predetermined time, checks to see whether normal communication could be conducted (step S815). When normal communication could be conducted, the process is ended. When normal communication could not be conducted, on the other hand, the communication path setting apparatus 200 deletes the provisionally set communication path (step S816), selects another destination candidate and transmits the name resolution response.

As described above, the third embodiment referred to the case in which the communication path is set by the user carrying on a dialog with the communication path setting apparatus 200 through the Web browsers of the communication terminal devices 10a to 10c. This invention, however, is not limited to such a case, but applicable also to a case in which the communication path is set not by the user but by the software incorporated in the communication terminal devices 10a to 10c.

Next, the communication path setting apparatus according to a fourth embodiment is explained. The basic configuration of the communication path setting system applicable to the communication path setting apparatus according to the fourth embodiment is the same as the one shown in FIG. 1. Referring to FIG. 1, the communication path setting apparatus according to the fourth embodiment, based on the destination name resolution request received from the nodes 1a to 1c and the name matching list set by the user in advance or at the time of factory shipment, selects the network 8, for example, from the networks 7, 8, 9, and transfers the received name resolution request to the name resolution server connected to the selected network 8. In response to the name resolution request, the name resolution response is received from the name resolution server. An authoritative name server resolution request addressed to the name resolution server is generated based on the received name resolution response and transmitted.

The communication path setting apparatus 2 receives the authoritative name server resolution response from the name resolution server in response to the authoritative name server resolution request, extracts the information on the authoritative name server from the authoritative name server resolution response received, and extracts the range of the network managed by the authoritative name server from the extracted information on the authoritative name resolution server.

The communication path setting apparatus according to the fourth embodiment generates a path with the extracted network range as an address and sets the generated path in the routing table data.

The name resolution request is a request issued to the name resolution server to search for the IP address corresponding to the host name of the destination. The authoritative name server resolution request is to request the name resolution server to search for the host name of the authoritative name resolution server which manages the domain entrusted thereto.

Figure 23:
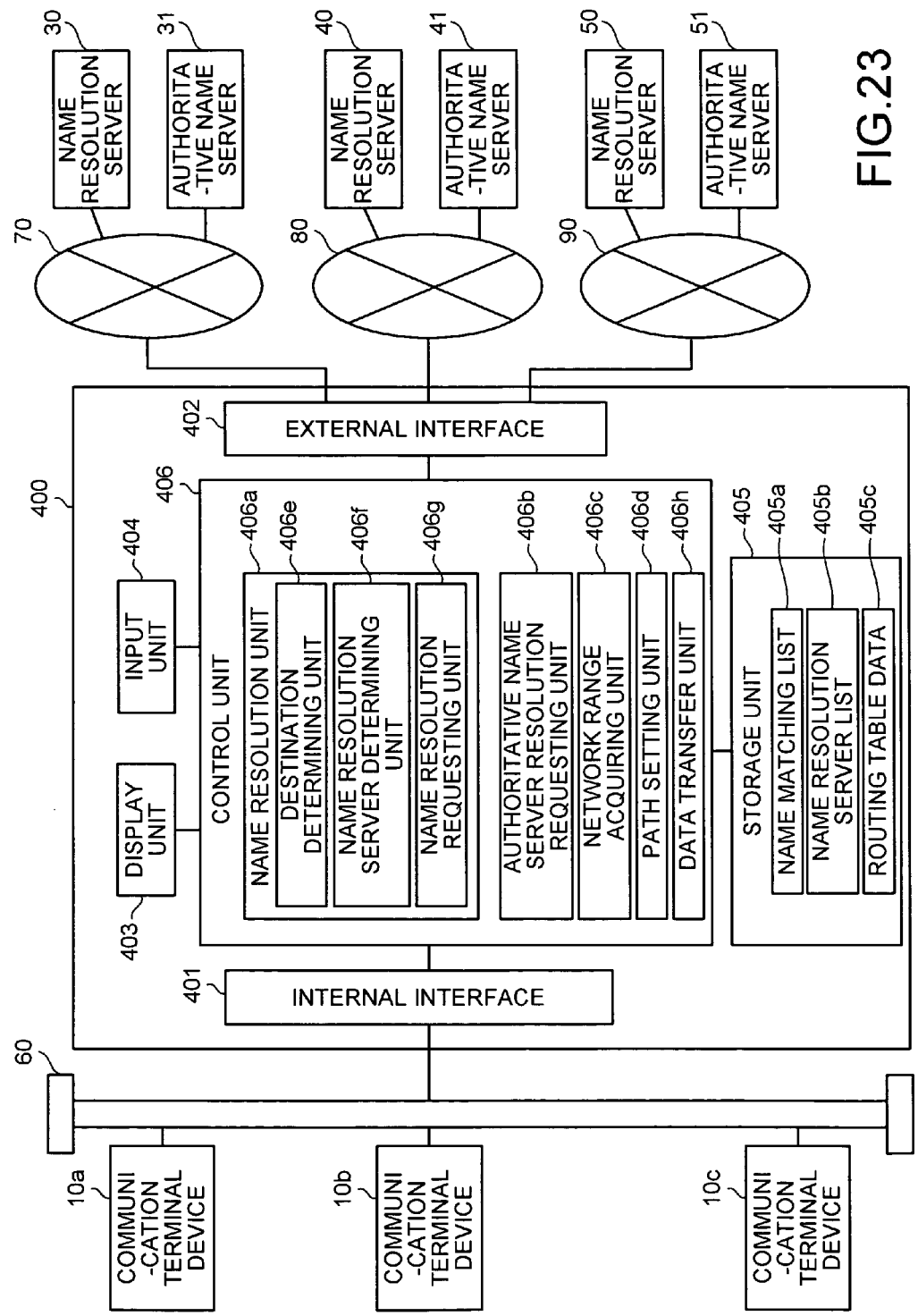
FIG. 23 is a function block diagram that depicts the network configuration of the communication path setting system and the functional configuration of the communication path setting apparatus according to a fourth embodiment.

Next, the configuration of a communication path setting system and a communication path setting apparatus according to the fourth embodiment is explained. FIG. 23 is a function block diagram that depicts the network configuration of a communication path setting system and the functional configuration of a communication path setting apparatus 400 according to the fourth embodiment. As shown in FIG. 23, the communication path setting system comprises communication terminal devices 10a to 10c, the communication path setting apparatus 400, name resolution servers 30, 40, 50, authoritative name servers 31, 41, 51, a network 60 that connects the communication terminal devices 10a to 10c and the communication path setting apparatus 400 and networks 70, 80, 90 that connect the communication path setting apparatus 400 and the name resolution servers 30, 40, 50 and the authoritative name servers 31, 41, 51, respectively.

FIG. 23 is an apparatus in which the authoritative name servers 31, 41, 51 and the name resolution servers 30, 40, 50 are shown as different devices from each other. Nevertheless, the name resolution servers 30, 40, 50 may have the function of the authoritative name servers 31, 41, 51.

The network 60 is a network using the TCP/IP protocol, or specifically constitutes a LAN, or the like. Also, the networks 70, 80, 90 are operated/managed by the internet provider or the contents provider, or specifically, constitute a lease line or WAN.

The communication terminal devices 10a to 10c are for conducting the communication between the networks 70, 80, 90 through the communication path setting apparatus 20 connected by the network 60. The name resolution servers 30, 40, 50 are DNS servers for executing the name resolution of the name resolution at the request received from the communication path setting apparatus 400 through the networks 70, 80, 90.

The communication path setting apparatus 400 comprises an internal interface unit 401, an external interface unit 402, an input unit 404, a display unit 403, a storage unit 405 and a control unit 406. The internal interface unit 401 is a network interface for conducting the communication with the communication terminal devices 10a to 10c through the network 60.

The external interface unit 402 is for conducting the communication with the name resolution servers 30, 40, 50 through the networks 70, 80, 90. The external interface unit 402 has different interfaces for the networks 70, 80, 90, respectively, which can be identified by the identification information such as "PPP0", "PPP1" and "PPP2". The external interface unit 402 makes up a network interface according to the invention.

The input unit 404 is for inputting a request or a command from the user, and specifically, a keyboard or a mouse. The display unit 403 is an output unit for displaying a request or a command of the user or the name resolution information.

The storage unit 405 is a hard disk drive (HDD) or a RAM making up a memory according to the invention. The storage unit 405 has stored therein a name matching list 405a, a name resolution server list 405b and a routing table data 405c. According to this embodiment, the name matching list 405a, the name resolution server list 405b and the routing table data 405c are all stored in the storage unit 405 alone. Instead, these data may be stored in different storage units, respectively.

The name matching list 405a is the data to determine to which of the networks 70, 80, 90 the name resolution requests transmitted from the communication terminal devices 10a to 10c are to be transferred by the communication path setting apparatus 400. FIG. 24 is a diagram that depicts the data structure of an example of the name matching list 405a. The name matching list 405a, as shown in FIG. 24, is the name patterns and the corresponding identification information of the external interface unit 402 for connecting to the destination network.

The name pattern, as shown in FIG. 24, has the mark "*" as a part of the domain name, of which the portion other than the mark "*" is compared with the octet of the domain name of the host contained in the name resolution request transmitted by the communication terminal devices 10a to 10c. The identification information of the external interface unit 402 is that of the external interface unit 402 corresponding to the network for transferring the name resolution request. The name matching list 405a is preset by the user or the manufacturer.

The name resolution server list 405b contains the description, for each network, of the IP address of the name resolution server existing in each of the networks 70, 80, 90. FIG. 25 is an example of the data structure of the name resolution server list 405b. The name resolution server list 405b, as shown in FIG. 25, contains the identification information of the external interface unit 402 for connecting to the destination network and the corresponding IP address of the name resolution server existing in the networks connected with the external interface unit 402 of the particular identification information.

When the communication path setting apparatus 400 is connected with the networks 70, 80, 90, the IP address of the name resolution server associated with each network is notified through the network from the common carrier or the contents provider providing the respective networks. The name resolution server list 405b has recorded therein the IP addresses of a plurality of the name resolution servers notified through each network name as classified for each network associated with the respective name resolution server.

The routing table data 405c is the data describing the communication path to be set by the communication path setting apparatus 400 between the communication terminal devices 10a to 10c and the networks 70, 80, 90, and constitutes the path information according to the invention. FIG. 26 is a data structure as an example of the routing table data 405c. The routing table data 405c, as shown in FIG. 26, includes the network range of the destination network and the corresponding identification information of the external interface unit 402 for connecting to the destination network. Although the address is indicated by the range of the IPv4 address in FIGS. 25 and 26, the address range based on the IP of other version such as IPv6 may be employed with equal effect.

The control unit 406 controls the whole communication path setting apparatus 400 by controlling the process and the data flow in each part upon receipt of the request and response of the name resolution and the authoritative name server resolution. The control unit 406 includes a name resolution unit 406a, an authoritative name sever resolution request unit 406b, a network range acquisition unit 406c, a path setting unit 406d and a data transfer unit 406h.

The name resolution unit 406a is a processor for performing the name resolution upon receipt of a name resolution request from the communication terminal devices 10a to 10c, and includes a destination determining unit 406e, a name resolution server determining unit 406f and a name resolution requesting unit 406g.

The destination determining unit 406e extracts the host name (domain name) of the destination from the name resolution request received from the communication terminal devices 10a to 10c, and compares the extracted host name with the name pattern of the name matching list 405a shown in FIG. 23, so that the identification information of the external interface unit 402 connected to the network of the destination corresponding to the name pattern coinciding (except for the portion "*") with the name pattern of the extracted host name is received from or delivered to the name resolution server determining unit 406f.

In the name resolution server determining unit 406f, the name resolution server associated with the network connected from the external interface 402 of the identification information received from the destination determining unit 406e is selected from a plurality of the name resolution servers listed for each network of the destination in the name resolution server list 405b, and with the selected name resolution server as an address, the name resolution request received from the communication terminal devices 10a to 10c is transferred.

The authoritative name server resolution requesting unit 406b receives the name resolution response from the name resolution servers 30, 40, 50 transferred in response to the name resolution request by the name resolution server determining unit 406f, and extracts the IP address from the name resolution response thus received. From the IP address thus extracted, an authoritative name server resolution request designating the reverse name lookup is generated, and transmitted to the name resolution server which has transmitted the name resolution response received. Incidentally, the authoritative name server resolution requesting unit 406b holds the name resolution responses received from the name resolution servers 30, 40, 50 for transfer to the communication terminal units 10a to 10c which have transmitted the name resolution request, and upon receipt of the notification from the path setting unit 406d that the routing table data has been completely set, transfers the name resolution responses thus far held to the communication terminal devices 10a to 10c that have transmitted the name resolution request.

FIGS. 27 and 28 are diagrams for explaining an example of the authoritative name server resolution response. As shown in FIGS. 27 and 28, the authoritative name server resolution response is configured of QUESTION SECTION, ANSWER SECTION, AUTHORITY SECTION and ADDITIONAL SECTION.

QUESTION SECTION contains the description of an inquiry designated as an authoritative name server resolution request. In the communication path setting apparatus 400 according to this embodiment, a SOA-designated inquiry requesting the SOA (start of authority) record managed by the authoritative name servers 31, 41, 51 is issued as an authoritative name server resolution request designating the reverse name lookup of the IP address of the destination host extracted from the name resolution response.

ANSWER SECTION contains the description of the answer to the inquiry designated as an authoritative name server resolution request.

AUTHORITY SECTION contains the description of the contents of the SOA record as authoritative information held by the authoritative name servers 31, 41, 51 for managing the zone of the domain having the name resolution servers 30, 40, 50 designated as an address. This SOA record contains the description of the host name of the authoritative name server.

The network range acquisition unit 406c, in response to the authoritative name server resolution request transmitted by the authoritative name server resolution requesting unit 206b, receives the authoritative name server resolution response from the name resolution servers 30, 40, 50, and extracts the range of the IP address of the zone managed by the authoritative name servers 31, 41, 51. This range of the IP address is defined as the network range. Also, the network range acquisition unit 406c notifies the extracted network range to the path setting unit 406d. The network range acquisition unit 406c makes up a network information acquisition unit according to the invention. Also, the network range makes up the network information according to the invention.

The path setting unit 406d generates the path data including the identification information of the external interface unit 202 corresponding to the network of the destination determined by the destination determining unit 406e and the corresponding network range extracted by the network range acquisition unit 406c. The path data thus generated are registered in the routing table data 405c. The path setting unit 406d generates the path data addressed to the network range notified from the network range acquisition unit 406c and has the transfer destination in the identification information of the external interface unit 402 for the network of the destination determined by the destination determining unit 406e. The path data thus generated are registered in the routing table data 405c. When the path information having the same address as the path data generated is already registered in the routing table data 405c, however, no path may be newly added or overwritten. Also, upon complete setting of the routing table data 405c, the path setting unit 406d notifies the name resolution unit 406a.

The data transfer unit 406h, upon receipt of the data addressed to other than the communication path setting apparatus 400 from the communication terminal devices 10a to 10c, determines the transfer destination by accessing the routing table data set by the path setting unit 406d and transfers the received data to the transfer destination thus determined.

Figure 29:
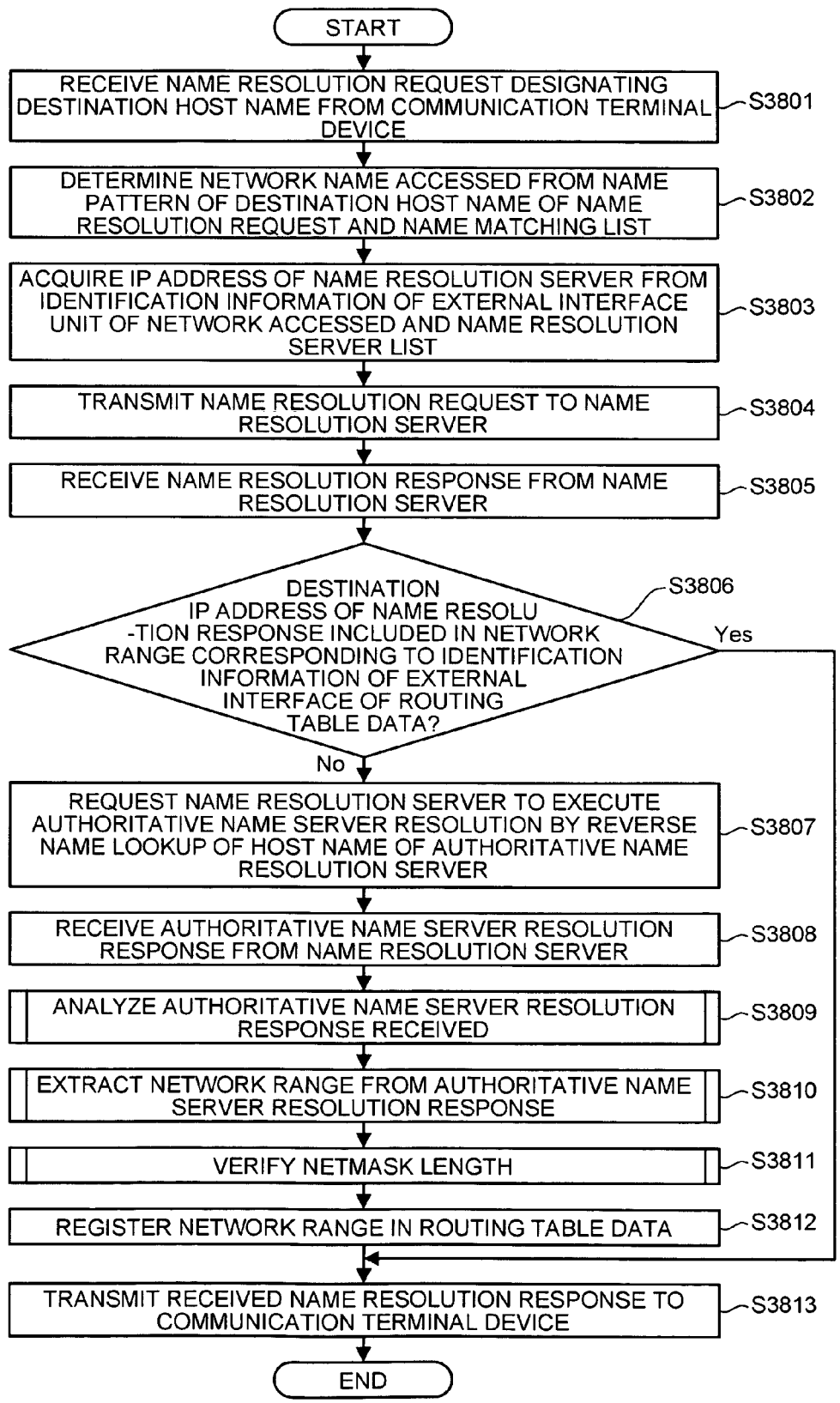
FIG. 29 is a flowchart that depicts the steps of the whole process of setting the communication path.

Next, the communication path setting process by the communication path setting apparatus 400 according to the fourth embodiment having the above-mentioned configuration is explained. FIG. 29 is a flowchart that depicts the steps of the whole communication path setting process.

First, the name resolution request designating the host name (domain name) of the destination host is transmitted to the communication path setting apparatus 400 for connection to the destination host from the communication terminal devices 10a to 10c. Then, the communication path setting apparatus 400 receives this name resolution request at the destination determining unit 406e through the internal interface unit 401 (step S3801). The destination determining unit 406e determines The network to be accessed from the name pattern of the destination host name (domain name) contained in the name resolution request and the name matching list 405a stored in the storage unit 405 (step S3802). Specifically, the destination host name extracted from the name resolution request is compared with the name pattern of the name matching list 405a. The identification information of the external interface unit 402 connected to the network of the destination corresponding to the name pattern coincident with the name pattern (at other than the portion "*") of the host name extracted is delivered to the name resolution server determining unit 406f. In the case of no coincidence, the extracted name is compared with the name pattern next registered. This comparison is continued in the order shown in the list until coincidence is achieved.

When the destination host name designated by the name resolution request is "WWW.smpl.exm.jp", for example, "*.exm.jp" in the name matching list 405a less "*" is coincident with the name pattern of the destination host name. By referring to the name matching list 405a shown in FIG. 24, therefore, the external interface unit 402 of the destination network is PPP1 and the destination network is the network 90. The destination determining unit 406e, upon determination of the network 90 to be accessed, delivers the identification information "PPP1" of the external interface unit 402 to the name resolution server determining unit 406f.

The name resolution server determining unit 406f that has received the identification information of the external interface unit 402 for the network determined acquires the IP addresses of the name resolution servers 30, 40, 50 from the name resolution server list 405b and the identification information of the external interface unit 402 (step S3803). When the destination determining unit 406e determines that the destination network is the network 90 and the identification information of the external interface unit 402 is "PPP1", for example, the name resolution server determining unit 406f acquires the IP address "100.10.20.50" of the name resolution server 50 corresponding to the identification information "PPP1" from the name resolution server list 405b. The name resolution server determining unit 406f delivers the acquired IP address to the name resolution requesting unit 406g.

Next, the name resolution requesting unit 406g that has received the IP address transmits the name resolution request received from the communication terminal devices 10a to 10c to the acquired IP address of the name resolution servers 30, 40, 50 (step S3804). In the case described above, the name resolution request is transmitted to the name resolution server 50 of the network 90.

As a result, in the name resolution servers 30, 40, 50, the IP address of the destination host name designated by the name resolution request is searched for, and the name resolution response including the IP address searched for is transmitted to the communication path setting apparatus 400.

In the communication path setting apparatus 400, the authoritative name server resolution requesting unit 406b receives the name resolution responses from the name resolution servers 30, 40, 50 (step S3806). The authoritative name server resolution requesting unit 406b determines whether the IP address of the destination host contained in the name resolution response received is included in the network range set by the routing table data 405c (step S3806). When the IP address of the destination host is "100.0.10.10", for example, this IP address is included in the network range "100.10.0.0/16" and the external interface unit 402 of the destination network is "PPP1". When the IP address of the destination host is "100.20.10.10", however, the authoritative name server resolution requesting unit 406b determines that the IP address is included neither in the network range "100.10.0.0/16" nor in other network ranges.

When determined at step S3806 that the IP address of the destination host is included in the network range set by the routing table data 405c (YES at step S3806), the name resolution response is not registered in the routing table data but transmitted to the communication terminal devices 10a to 10c (step S3813).

When determined at step S3806 that the IP address of the destination host is not included in the network range set by the routing table data 405c (NO at step S3806), on the other hand, the authoritative name server resolution requesting unit 406b generates an authoritative name server resolution request to search for the host name of the authoritative name servers 31, 41, 51 by reverse name lookup and transmitted to the name resolution servers 30, 40, 50 (step S3807).

Specifically, as shown in QUESTION SECTION in the example in FIGS. 27 and 28, "20.16.96.33.in-addr.arpa.IN SOA" and the IP address "33.96.16.20" of the destination host are designated by reverse name lookup while at the same time requesting the SOA record.

As a result, the name resolution servers 30, 40, 50 transmit the authoritative name server resolution response containing the SOA record and the host name of the authoritative name servers 31, 41, 51 of each network to the communication path setting apparatus 400.

The communication path setting apparatus 400 receives the authoritative name server resolution response from the name resolution servers 30, 40, 50 through the network range acquisition unit 406c (step S3808), analyzes the authoritative name server resolution response received (step S3809), extracts the network range from the authoritative name server resolution response (step S3810) and verifies the netmask length (step S3811). The process of analyzing the authoritative name server resolution response, extracting the network range and verifying the netmask length are described later.

Upon completion of the network range extraction and the netmask verification, the path setting unit 406d registers the netmask and the network range in the routing table data 405c. Upon complete registration, the path setting unit 406d notifies the name resolution requesting unit 406g of the complete registration. The name resolution requesting unit 406g that has received the notification transmits the name resolution responses received from the name resolution servers 30, 40, 50 and held therein to the communication terminal devices 10a to 10c (step S3813). As a result, the communication path setting process is completed, and the communication terminal devices 10a to 10c access the destination host based on the path set in the routing table data 405c of the communication path setting apparatus 400.

Figure 30:
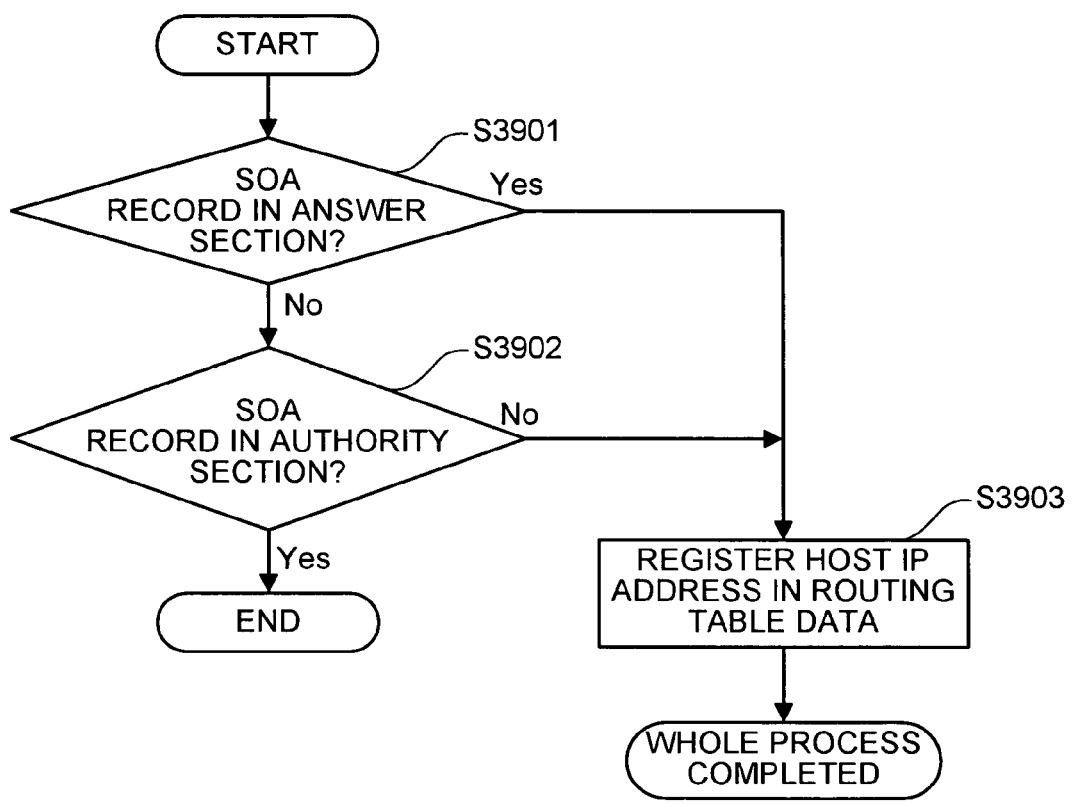
FIG. 30 is a flowchart that depicts the steps of the process for analyzing the authoritative name server resolution response.

Next, the process of analyzing the authoritative name server resolution response by the network range acquisition unit 3206 at step S3809 is explained. FIG. 30 is a flowchart that depicts the steps of analyzing the authoritative name server resolution response. First, the network range acquisition unit 406c determines whether the SOA record is contained in ANSWER SECTION of the authoritative name resolution response shown in FIGS. 27, 28 (step S3901). When determined that SOA record is contained in ANSWER SECTION (YES at step S3901), the IP address of the destination host contained in the name resolution response is registered in the routing table data 405c in correspondence with the identification information of the external interface unit 402 (step S3903). Thus, the whole process is terminated without extracting the network range. For example, FIG. 28 is a case in which SOA record is described in ANSWER SECTION.

When determined that ANSWER SECTION contains no SOA record (NO at step S3901), on the other hand, it is determined whether AUTHORITY SECTION contains SOA record (step S3902). When determined that AUTHORITY SECTION contains no SOA record (NO at step S3902), an error is decided, and the IP address of the destination host contained in the name resolution response is registered in the routing table data 405c in correspondence with the identification information of the external interface unit 402 (step S3903), so that the whole process is terminated without extracting the network range.

When determined that AUTHORITY SECTION contains SOA record (YES at step S3902), on the other hand, the analysis process is terminated, and the network range extraction process is continued. FIG. 27 is, for example, a case in which SOA record is described in AUTHORITY SECTION.

Figure 31:
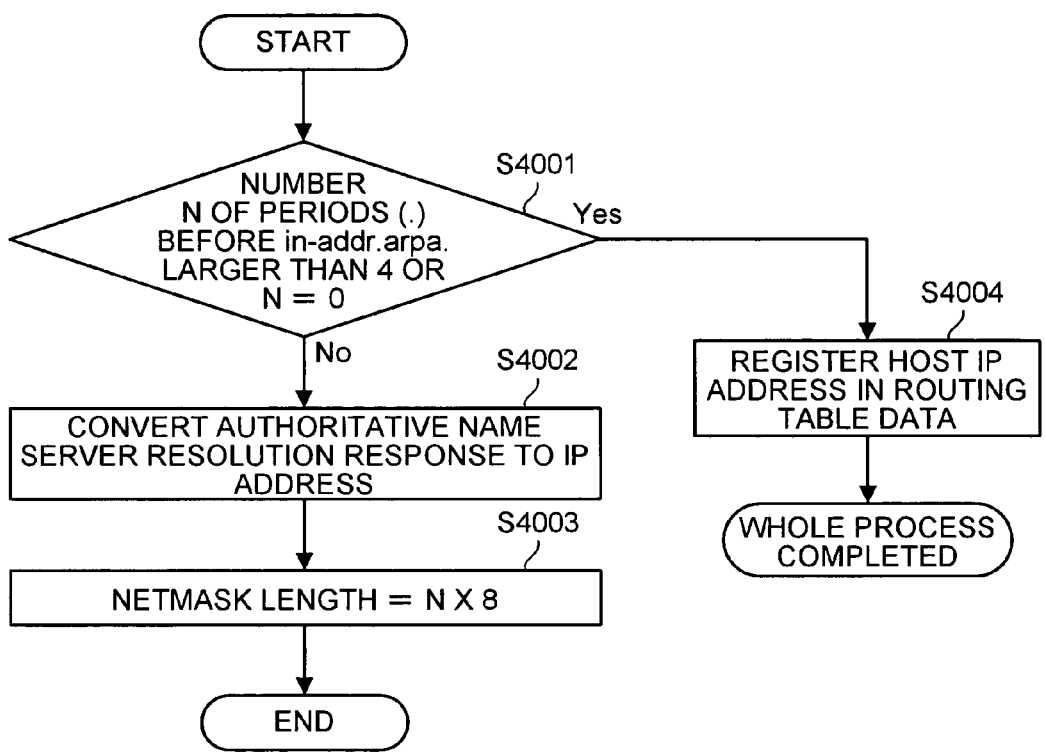
FIG. 31 is a flowchart that depicts the steps of the process for extracting the network range from the authoritative name server resolution response.

Next, the process of extracting the network range from the authoritative name server resolution response by the network range acquisition unit 406c at step S3810 is explained. FIG. 31 is a flowchart that depicts the steps of the process of extracting the network range from the authoritative name server resolution response.

First, the network range acquisition unit 406c determines whether the number N of periods (.) before "in-addr.arpa." is larger than 4 or equal to 0 in SOA record described in AUTHORITY SECTION (step S4001). When the number N is larger than 4 or equal to 0, an error is decided, and the IP address of the destination host contained in the name resolution response is registered in the routing table data 405c in correspondence with the identification information of the external interface unit 402 (step S4004), so that the whole process is terminated without extracting the network range.

When the number N, that is, the number of periods is not less than one but not more than 4, on the other hand, the authoritative name server resolution response is converted into an IP address (step S4002). Specifically, the octet designated by reverse name lookup before "in-addr.arpa." of the authoritative name server described in SOA record of AUTHORITY SECTION is converted into an IP address. When all the octets making up the IP address are not described, the octets not described are regarded as 0.

In the case of FIG. 27, for example, AUTHORITY SECTION contains the description of "16.96.33.in-addr.arpa.", in which the number N of periods (.) before "in-addr.arpa." is 3, so that the numerical value "16.96.33" is converted into the IP address "33.96.16.0". When AUTHORITY SECTION contains the description "172.in-addr.arpa.", on the other hand, the number N of periods (.) before "in-addr.arpa." is 1, so that the numerical value "172" is converted into the IP address "172.0.0.0".

Next, the netmask length L is set to N×8 (step S4003). In the case of FIG. 27, N=3, and therefore the netmask length L is 24. By this process, the network range and the netmask length are acquired. When the characters or symbols other than numerals are contained such as "128-255.16.96.33" or "subnet64.16.96.33", however, means or a process for acquiring the netmask length may be employed. When the netmask length cannot be correctly acquired, an error is decided. Then, the IP address of the destination host contained in the name resolution response is registered in the routing table data 405c in correspondence with the identification information of the external interface unit 402 (step S4004), and the whole process is terminated without extracting the network range.

Figure 32:
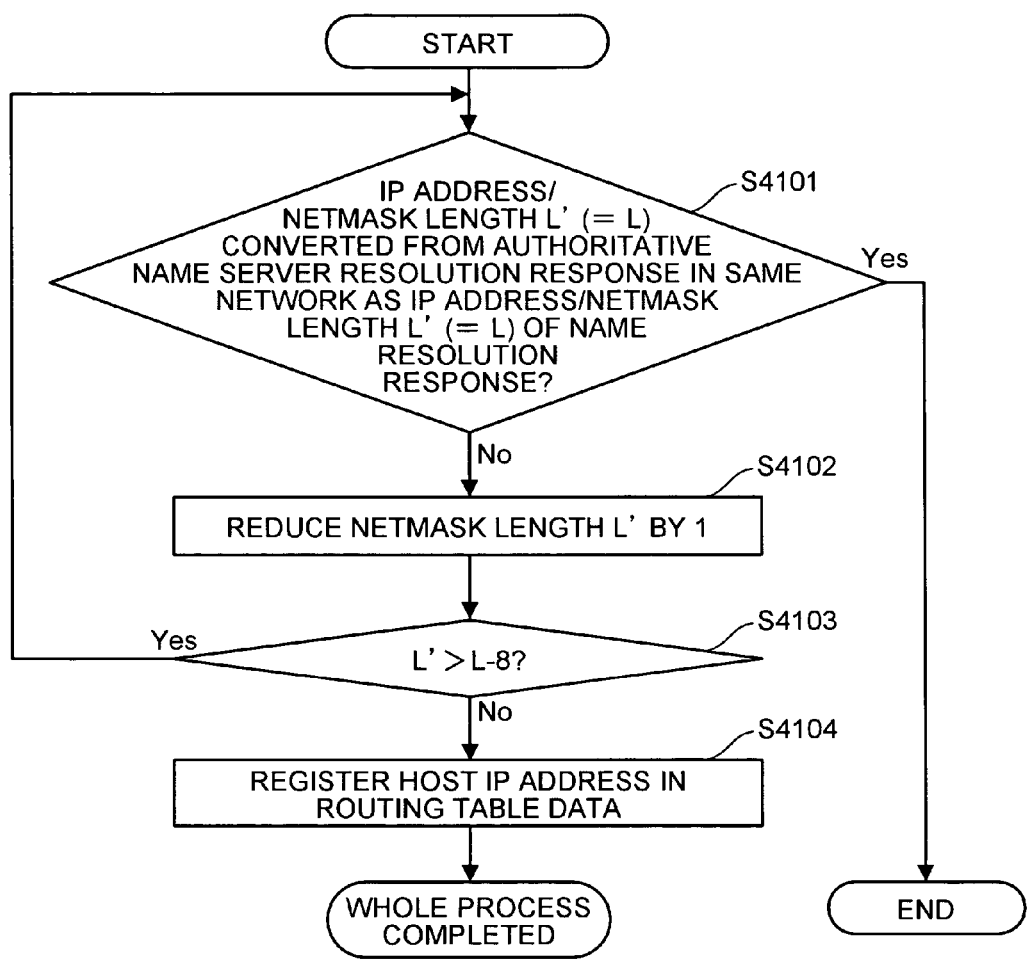
FIG. 32 is a flowchart that depicts the steps of the netmask verification process.

Next, the netmask verification process by the network range acquisition unit 206c at step S3811 is explained. FIG. 32 is a flowchart that depicts the steps of the met mask verification process.

First, the network range acquisition unit 406c determines whether the IP address/netmask length (L') converted from the authoritative name server resolution response at step S4002 is associated with the same network as the IP address/netmask length L' of the destination host contained in the name resolution response. It is determined that they are associated with the same network when the leading L' bits of the IP address have the same value.

In the IP address described above, for example, it is determined that "33.96.16.0/24" and "33.96.16.10/24" are associated with the same network, while "33.96.16.0/24" and "33.96.20.10/24" are not associated with the same network.

When determined at step S4101 that the IP address/netmask length L' converted from the authoritative name server resolution response at step S4002 is associated with the same network as the IP address/netmask length L' of the destination host contained in the name resolution response (YES at step S4101), the process is terminated.

When determined at step S4101 that the IP address/netmask length L' converted from the authoritative name server resolution response at step S4002 is not associated with the same network as the IP address/netmask length L' of the destination host contained in the name resolution response (NO at step S4101), on the other hand, the netmask length L' is decremented by 1 (step S4102) thereby to determine whether L' is larger than the netmask length L−8 (step S4103). Until L' is reduced to or less than the netmask length L−8 (YES at step S4103), the process of steps S4101 and S4102 is repeatedly executed. Meanwhile, when determined at step S4101 that the IP address/netmask length L' converted from the authoritative name server resolution response at step S4002 is associated with the same network as the IP address/netmask length L' of the destination host contained in the name resolution response (YES at step S4101), the process is terminated.

When not determined until L' is reduced to or less than the netmask length L−8 that the IP address/netmask length L' converted from the authoritative name server resolution response at step S4002 is associated with the same network as the IP address/netmask length L' of the destination host contained in the name resolution response (NO at step S4103), it indicates that the network range is not determined. Therefore, the IP address of the destination host contained in the name resolution response is registered in the routing table data 405c in correspondence with the identification information of the external interface unit 402 (step S4104), and the whole process is terminated without extracting the network range. By the process described above, the network range is determined and set in the routing table data 405c.

As described above, in the communication path setting apparatus 400 according to the fourth embodiment, the name resolution response containing the address information of the destination host is received from the name resolution server in response to a name resolution request, and based on the name resolution response received, the SOA record containing the zone managed by the authoritative name servers 31, 41, 51 of the network having the destination host and the host name of the authoritative name server is requested and transmitted to the name resolution servers 30, 40, 50. In response to the authoritative name server resolution request thus transmitted, the authoritative name server resolution response containing the SOA record is received from the name resolution servers 30, 40, 50. Based on the SOA record of the authoritative name server resolution response thus received, the network range is acquired, and the acquired network range is set in the routing table data 405c together with the corresponding identification information of the external interface unit 402 for the network. Therefore, the IP address is not required separately for each destination host in the routing table data 405c, with the result that the data amount of the routing table data 405c is reduced and the data change is minimized for efficient execution of the path setting process.

In the communication path setting apparatus 400 according to the fourth embodiment, the network range acquired is set in the routing table data 405c together with the corresponding identification information of the external interface unit 402 for the network. Therefore, the proper communication path can be easily set without the routing protocol or the path setting job on the part of the user.

The fourth embodiment is explained above using the format of IPv4 as an IP address. Also, with regard to the IP address of IPv6 format, the communication path setting process is executed in similar fashion by correcting the maximum value of the number N of periods from "4" to "32", the calculation formula for the netmask length L from "N×8" to "N×4", the domain name for reverse name lookup from "in-addr.arpa" to "ip6.arpa." and the repetition end condition for the netmask verification process from "L−8" to "L−4".

The configuration of the communication path setting apparatus and the communication path setting method according to the fourth embodiment described above can be combined with the configuration of the communication path setting apparatus and the communication path setting method according to the first to third embodiments. In other words, the routing table data 205b acquired by the communication path setting method explained in the first to third embodiments can be used as the routing table data 405c shown in FIG. 23.

The configuration of the communication path setting apparatus and the communication path setting method according to the first to fourth embodiments can be implemented not only as a network node of a router for executing the communication path setting process but also by a computer system such as a personal computer or a work station executing the program written in advance. In a fifth embodiment, therefore, a computer system that executes the communication path setting program having the same function as the communication path setting apparatus according to the first to fourth embodiments is explained.

Figure 33:
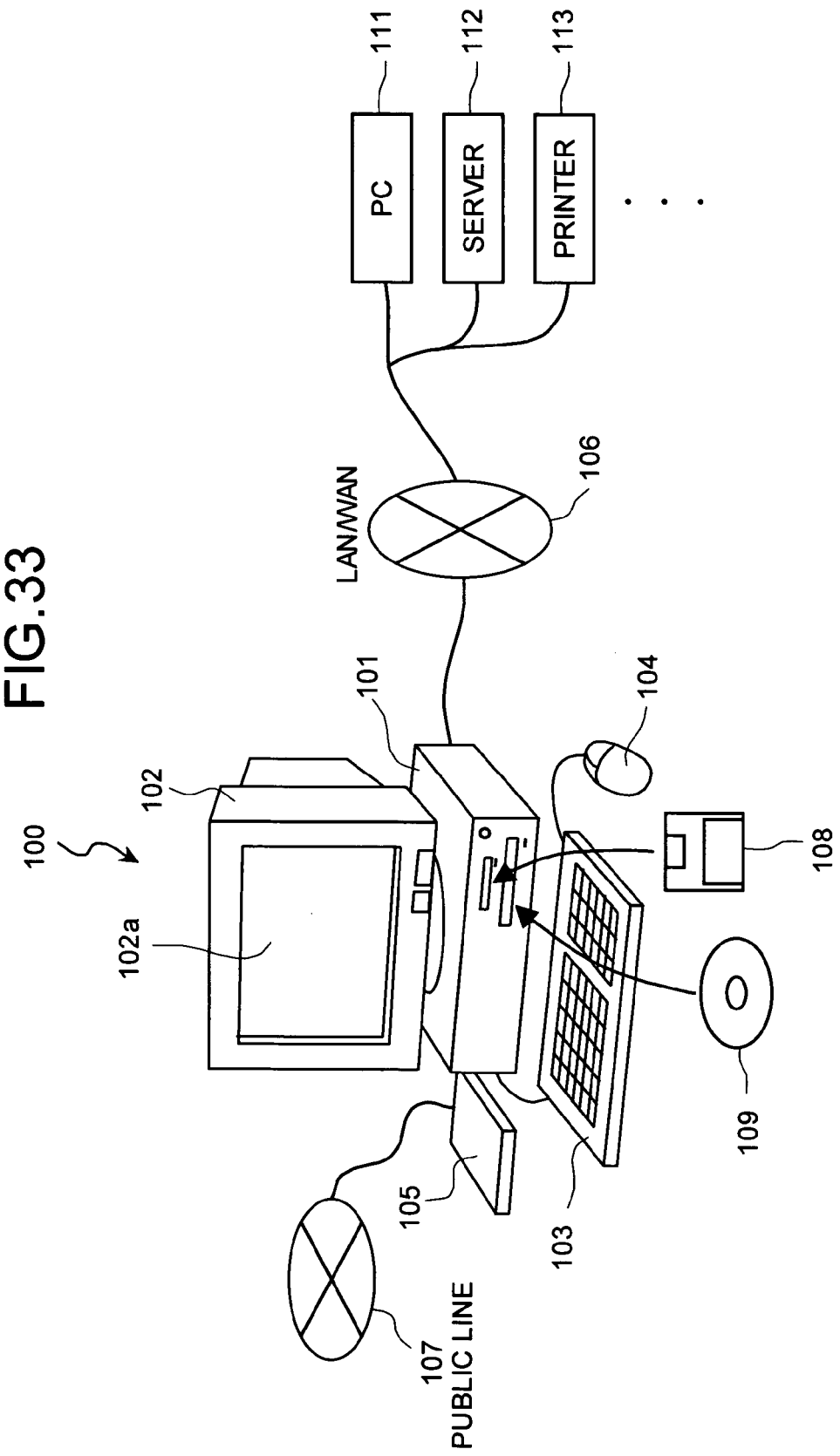
FIG. 33 is a diagram that depicts the system configuration of the computer system according to a fifth embodiment.
Figure 34:
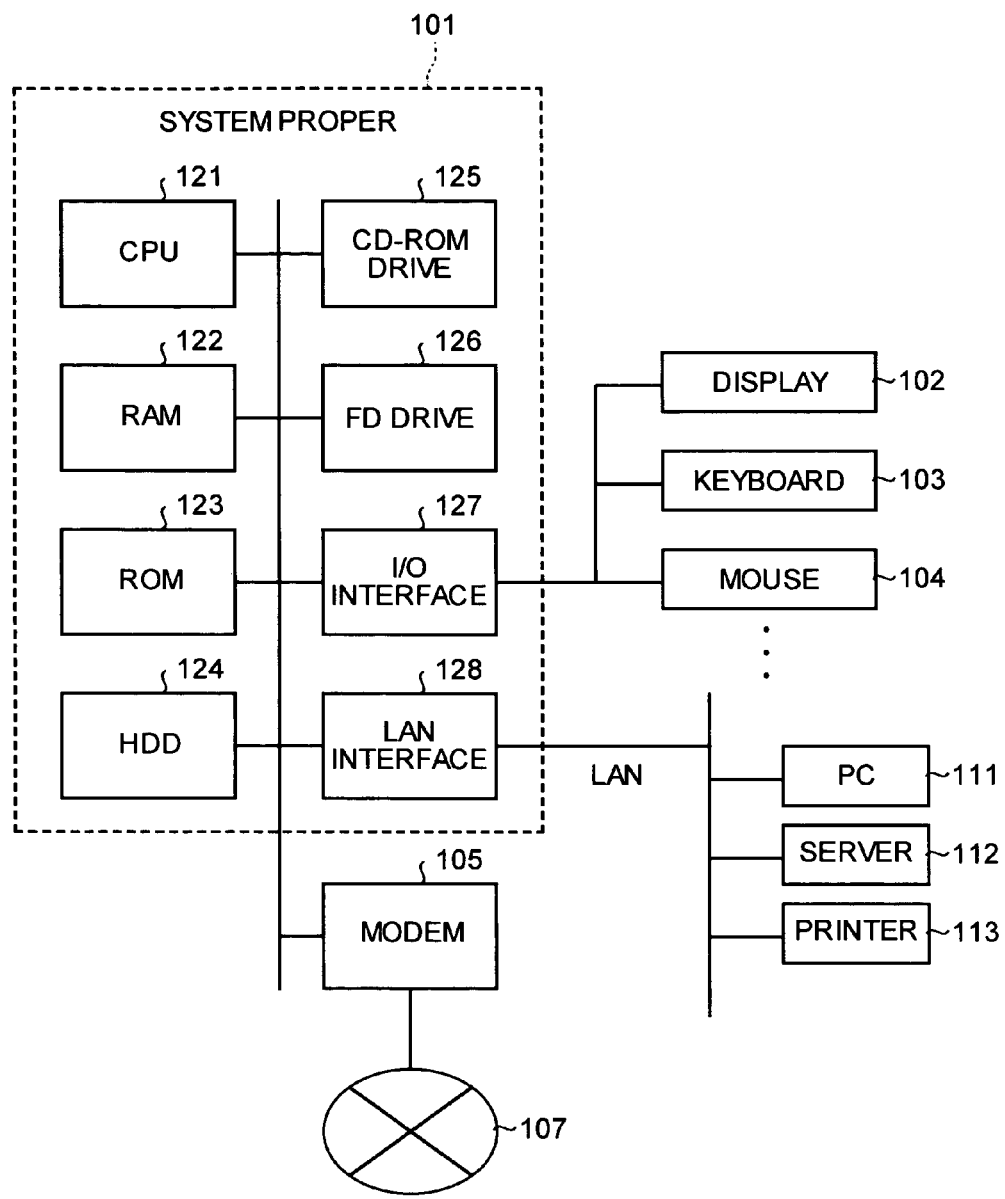
FIG. 34 is a block diagram that depicts the configuration of the system proper of the computer system shown in FIG. 33.

FIG. 33 is a diagram that depicts a system configuration of a computer system according to the fifth embodiment. FIG. 34 is a block diagram that depicts a configuration of the system proper of the computer system shown in FIG. 33. As shown in FIG. 33, the computer system 100 according to the fifth embodiment comprises a system proper 101, a display 102 that displays the information such as an image on a display screen 102 in response to an instruction from the system proper 101, a keyboard 103 for inputting various information in the computer system 100, and a mouse 104 for designating an arbitrary position on the display screen 102a of the display 102.

The system proper 101 of the computer system 100 includes, as shown in FIG. 34, a CPU 121, a RAM 122, a ROM 123, a hard disk drive (HDD) 124, a CD-ROM drive 125 that receives a CD-ROM 109, a FD drive 126 that receives a flexible disk (FD) 108, a display 102, an I/O interface 127 that connects the keyboard 103 and the mouse 104, and a LAN interface 128 that connects to a local area network (LAN) or a wide area network (WAN) 106.

Further, the computer system 100 is connected with a modem 105 to connect a public line 107 such as an internet on the one hand and another computer system (PC) 111, a server 112 and a printer 113 through the LAN interface 128 and the LAN/WAN 106 on the other hand.

The computer system 100 implements the communication path setting apparatus by reading and executing the communication path setting program recorded in a predetermined recording medium. The predetermined recording medium is any recording medium used to record the communication path setting program readable by the computer system 100, such as a "portable physical medium" including the flexible disk (FD) 108, the CD-ROM 109, a MO disk, a DVD (digital versatile disk), a magnetooptic disk or an IC card, a "fixed physical medium" including a hard disk drive (HDD) 124 arranged in and around the computer system 100, the RAM 122 or the ROM 123.

Specifically, the communication path setting program is recorded in a computer readable manner in the recording medium such as "the portable physical medium" or "the fixed physical medium" described above, and the computer system 100 implements the communication path setting apparatus and the communication path setting method by reading and executing the communication path setting program from these recording media. The communication path setting program according to the invention is not limited to the computer system 100 for its execution, but another computer system 111 or the server 112 can execute the communication path setting program independently or in collaboration with each other. The communication path setting program executed in the communication path setting apparatus according to the first to fourth embodiments, for example, is stored in a computer connected to a network such as an internet and downloaded through the network. Also, the communication path setting program executed by the communication path setting apparatus according to the first to fourth embodiments can be provided or distributed through the network such as the internet. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for setting a communication path between a communication terminal device, connected through a first network, and a first destination of one of a plurality of second networks, the apparatus comprising:
a name resolution request generator that generates a first name resolution request addressed to each of a plurality of name resolution servers located in the second networks based on a second name resolution request for name resolution of the first destination received from the communication terminal device, and transmits the first name resolution request to each of the plurality of name resolution servers;
a destination determiner that assigns a priority to a first name resolution response received from each of the plurality of name resolution servers in response to the first name resolution request transmitted by the name resolution request generator, and determines a second destination based on the priority; and
a path setting unit that sets a path by generating a routing table from path information including address information of the second destination determined by the destination determiner, address information of a gateway located in the second network having the first destination, and an interface name of the apparatus,
wherein the destination determiner assigns the priority of the first name resolution response received from each of the plurality of name resolution servers based on a length of a portion, from top level domain, shared between a domain name of the first name resolution response received from each of the plurality of name resolution servers and a domain name of a connection from the path setting unit to each of the plurality of second networks, and determines the second destination based on the priority.

2. The apparatus according to claim 1,
wherein the destination determiner, if unable to assign the priority to the first name resolution response based on the length of the shared portion and to determine the second destination based on the priority, assigns a priority to the first name resolution response based on order of receipt of the first name resolution response, and determines the second destination based on the priority.

3. The apparatus according to claim 1, further comprising a connection controller that requests the name resolution request generator to acquire a domain name of one of the name resolution servers and the gateway based on the address information of one of the name resolution servers and the gateway,
wherein the name resolution request generator generates a third name resolution request for a domain name of one of the name resolution servers and the gateway requested by the connection controller, and transmits the third name resolution request to the name resolution server for each connection, and
wherein the destination determiner determines, as the domain name for the connection of the second networks, the domain name of one of the name resolution servers and the gateway included in a second name resolution response received from the name resolution server in response to the third name resolution request transmitted by the name resolution request generator.

4. The apparatus according to claim 3,
wherein the connection controller disconnects or connects a communication between the communication terminal device and the second networks, depending on a service provided by the communication, and
the name resolution request generator causes the connection controller to reconnect the communication disconnected by the connection controller, and based on the second name resolution request, generates and transmits a fourth name resolution request to the name resolution server.

5. The apparatus according to claim 3,
wherein the connection controller disconnects or connects a communication between the communication terminal device and the second networks depending on a service provided by the communication, and
the name resolution request generator, based on the second name resolution request, except for the communication disconnected by the connection controller, generates and transmits a fifth name resolution request to the name resolution server.

6. The apparatus according to claim 1,
wherein if the address information included in the path information is limited in an application range on the network, the path setting unit generates a corresponding host route from the address information included in the path information and the address information of the gateway, and sets the host route in the routing table.

7. The apparatus according to claim 6, further comprising:
a cache for storing the cache information including a domain name of the second destination determined by the destination determiner, the path information, a period of validity of the path information, and information as to whether the period of validity has expired; and
a cache manager that manages the cache information and a history of application during a predetermined period,
wherein the cache manager, upon determination that the period of validity of the cache information stored in the cache has expired and the cache information includes no history of application during the predetermined period, requests the path setting unit to delete the path information corresponding to the cache information from the routing table, and deletes the cache information from the cache, and
the path setting unit deletes the path information from the routing table as requested by the cache manager.

8. The apparatus according to claim 1,
wherein if the address information of a second destination using same connection as the destination determined by the destination determiner is included in the routing table, the path setting unit aggregates address information of all the second destinations using the same connection as aggregated address information, and replaces the address information of all the second destinations with the aggregated address information.

9. The apparatus according to claim 8,
wherein if the address information of the second destination determined by the destination determiner is limited in an application range on the network, the path setting unit does not aggregate the address information of the destination using the same connection.

10. The apparatus according to claim 8, further comprising:
a cache for storing the cache information including a domain name of the second destination determined by the destination determiner, the path information, a period of validity of the path information, and information as to whether the period of validity has expired; and a cache manager that manages the cache information and a history of application during a predetermined period, wherein the cache manager, upon determination that the period of validity of the cache information stored in the cache has expired and the cache information includes no history of application during the predetermined period, requests the path setting unit to delete the path information corresponding to the cache information from the routing table, and deletes the cache information from the cache, and the path setting unit, when the path information of which the deletion is requested by the cache manager is included in the routing table, deletes the path information from the routing table, and the path setting unit, when the path information is not included in the routing table and the cache manager requests all the path information including the address information of the second destinations aggregated into the aggregated address information to be deleted, deletes the path information including the aggregated address information from the routing table.

11. The apparatus according to claim 1, further comprising a name resolution response generator that generates a third name resolution response including the second destination determined by the destination determiner, and transmits the third name resolution response to the communication terminal device.

12. The apparatus according to claim 11, wherein the name resolution response generator generates a response indicating no second destination when the first name resolution response including the first destination is not included in a name resolution response returned from the name resolution server, and transmits the response to the communication terminal device.

13. The apparatus according to claim 1, wherein the name resolution request generator, upon receipt of a request for name resolution of a first destination host from the communication terminal device, transmits a sixth name resolution request for address information of the first destination host to a name resolution server which performs name resolution for the first destination host and which is located in the second network where the first destination host is located;

the apparatus further comprising:

a storage unit for storing path information including identification information of a network interface for connecting the apparatus to the second networks, respectively, and network information associated with the identification information, the network information indicating a range of addresses included in a second domain of an authoritative name server assigned to manage a domain of the second network, wherein the second network is connected by a network interface of the apparatus;

an authoritative name server resolution requesting unit that receives a fourth name resolution response including the address information of the first destination host in response to the sixth name resolution request from the name resolution server, and based on the fourth name resolution response, transmits to the name resolution server an authoritative name server request for authoritative information including the domain of the second network having the first destination host and the information of the authoritative name server assigned to manage the domain of the second network; and a network information acquiring unit that receives an authoritative name server resolution response including the authoritative information in response to the authoritative name server resolution request from the name resolution server, and acquires the network information based on the authoritative information of the authoritative name server resolution response, wherein the path setting unit generates the path information by determining an address range obtained from the network information acquired by the network information acquiring unit, in correspondence with the identification information of the network interface.

14. The apparatus according to claim 13, wherein the authoritative name server resolution requesting unit determines whether the address information included in the name resolution response received is included in the address range obtained by the network information set in the path information, and upon determination that the address information is not included, transmits the authoritative name server resolution request to the name resolution server based on the name resolution response received.

15. The apparatus according to claim 13, wherein the authoritative name server resolution requesting unit transmits the authoritative name resolution request by reverse name lookup to the name resolution server based on the address information of the first destination host included in the name resolution response.

16. The apparatus according to claim 13, wherein the network information acquiring unit determines whether the authoritative name server resolution response received from the name resolution server includes the authoritative information, and upon determination that the authoritative information is included, converts the authoritative information to address information of the authoritative name server, and based on the address information of the authoritative name server converted, acquires a range of addresses included in the network.

17. The apparatus according to claim 16, wherein the path setting unit, upon determination by the network information acquiring unit that the authoritative information is not included in the authoritative name server resolution response received from the name resolution server, determines, as the path information, the address information of the first destination host included in the name resolution response in correspondence with the identification information of the network interface.

18. The apparatus of claim 16, wherein the network information acquiring unit determines a netmask from the authoritative information, determines whether the address information of the authoritative name server and the netmask are identical with the address information of the first destination host included in the name resolution response of the second networks and the netmask, and upon determination that the netmasks represent a same network, acquires the address information of the authoritative name server and the netmask as an address range included in the networks.

19. A method of setting a communication path between a communication terminal device, connected through a first network, and a first destination of one of a plurality of second networks, the method comprising:

generating a first name resolution request addressed to each of a plurality of name resolution servers located in the second networks based on a second name resolution request for name resolution of the first destination received from the communication terminal device;

transmitting the first name resolution request to each of the plurality of name resolution servers;

assigning a priority to a first name resolution response received from each of a plurality of name resolution servers in response to the first name resolution request transmitted, based on a length of a portion, from top level domain, shared between a domain name of the first name resolution response and a domain name of a connection to the plurality of second network;

determining a second destination based on the priority; and setting a path by generating a routing table from path information including address information of the destination determined, address information of a gateway located in the second networks, and an interface name.

20. A computer program product for setting a communication path between a communication terminal device, connected through a first network, and a first destination of one of a plurality of second networks, the computer program product having a computer readable medium including programmed instructions, wherein the instructions, when executed by a computer, cause the computer to perform:

generating a first name resolution request addressed to each of a plurality of name resolution servers located in the second networks based on a second name resolution request for name resolution of the first destination received from the communication terminal device;

transmitting the first name resolution request to each of the plurality of name resolution servers;

assigning a priority to a first name resolution response received from each of a plurality of name resolution servers in response to the first name resolution request transmitted, based on a length of a portion, from top level domain, shared between a domain name of the first name resolution response and a domain name of a connection to the plurality of second network;

determining a second destination based on the priority; and setting a path by generating a routing table from path information including address information of the destination determined, address information of a gateway located in the second networks, and an interface name.

* * * * *